United States Patent
Buschbeck et al.

(10) Patent No.: US 10,672,159 B2
(45) Date of Patent: Jun. 2, 2020

(54) ANCHOR GRAPH

(71) Applicant: Microsoft Technology Licensing, LLC, Redmond, WA (US)

(72) Inventors: Michael Alexander Buschbeck, Bavaria (DE); Jad Nohra, Bavaria (DE); Oliver Michael Strunk, Munich (DE)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 15 days.

(21) Appl. No.: 15/943,636

(22) Filed: Apr. 2, 2018

(65) Prior Publication Data

US 2019/0304146 A1   Oct. 3, 2019

(51) Int. Cl.
*G06T 11/20* (2006.01)
*G06T 19/00* (2011.01)
*G06T 7/73* (2017.01)

(52) U.S. Cl.
CPC ............. *G06T 11/206* (2013.01); *G06T 7/73* (2017.01); *G06T 19/006* (2013.01); *G06T 2207/20072* (2013.01)

(58) Field of Classification Search
CPC .......................... G06T 11/206; G06T 19/006
USPC ........................................................ 345/440
See application file for complete search history.

(56) References Cited

U.S. PATENT DOCUMENTS

| | | | | |
|---|---|---|---|---|
| 6,034,739 A | * | 3/2000 | Rohlfing | H04N 5/222 345/420 |
| 9,715,008 B1 | * | 7/2017 | Cote | G01S 13/885 |
| 9,984,510 B1 | * | 5/2018 | Kinstner | G06T 19/006 |
| 2010/0162151 A1 | * | 6/2010 | Class | G06F 3/0483 715/765 |
| 2012/0249741 A1 | * | 10/2012 | Maciocci | G06F 3/011 348/46 |
| 2013/0194275 A1 | * | 8/2013 | Hrcka | G06T 11/60 345/440 |

(Continued)

OTHER PUBLICATIONS

Giorgio Grisetti et al., "A Tutorial on Graph-based SLAM" IEEE Intelligent Transportation Systems 2010 IEEE Magazine, Date of publication: Feb. 4, 2011.*

(Continued)

*Primary Examiner* — Javid A Amini
(74) *Attorney, Agent, or Firm* — Alleman Hall Creasman & Tuttle LLP

(57) ABSTRACT

A computing system, including at least one imaging sensor configured to collect imaging data of a physical environment. The computing system may further include a processor configured to generate, based on the imaging data, a first anchor graph including a first plurality of anchors connected by a first plurality of edges. Each anchor of the first plurality of anchors may indicate a respective estimated position in the physical environment. The processor may be further configured to detect a change in the estimated position of at least one anchor of the first plurality of anchors relative to the at least one imaging sensor. Based on the change in the estimated position, the processor may reposition the first anchor graph relative to the at least one imaging sensor. Estimated lengths of the first plurality of edges and estimated angles between the first plurality of edges may remain fixed.

17 Claims, 20 Drawing Sheets

(56) References Cited

U.S. PATENT DOCUMENTS

| | | | |
|---|---|---|---|
| 2014/0149903 A1* | 5/2014 | Ahn | G06F 3/0488 |
| | | | 715/765 |
| 2015/0235397 A1* | 8/2015 | Beckman | G06T 11/206 |
| | | | 345/440 |
| 2015/0242008 A1* | 8/2015 | Beckman | G06F 3/043 |
| | | | 345/177 |
| 2016/0078657 A1* | 3/2016 | McCord | G06T 19/006 |
| | | | 345/440 |
| 2016/0210784 A1* | 7/2016 | Ramsby | G06T 19/006 |
| 2016/0217614 A1* | 7/2016 | Kraver | G06T 19/006 |
| 2017/0287218 A1* | 10/2017 | Nuernberger | G06T 19/006 |
| 2017/0336641 A1* | 11/2017 | von und zu Liechtenstein | |
| | | | G02B 13/14 |
| 2018/0020978 A1* | 1/2018 | Kaifosh | G16H 50/50 |
| | | | 702/150 |
| 2018/0053315 A1 | 2/2018 | Ard et al. | |
| 2018/0096528 A1* | 4/2018 | Needham | G06T 7/70 |
| 2018/0144547 A1* | 5/2018 | Shakib | G06T 19/003 |
| 2018/0293802 A1* | 10/2018 | Hendricks | G06T 19/006 |
| 2019/0114802 A1* | 4/2019 | Lazarow | G06T 7/74 |

OTHER PUBLICATIONS

Grisetti, et al., "A Tutorial on Graph-Based SLAM", In Proceedings of the IEEE Intelligent Transportation Systems Magazine, Jan. 1, 2010, 11 Pages.

Liu, et al., "Large Graph Construction for Scalable Semi-Supervised Learning", In Proceedings of the 27th International Conference on Machine Learning, Jun. 21, 2010, 8 Pages.

"International Search Report and Written Opinion Issued in PCT Application No. PCT/US19/021721", dated Jul. 2, 2019, 12 Pages.

* cited by examiner

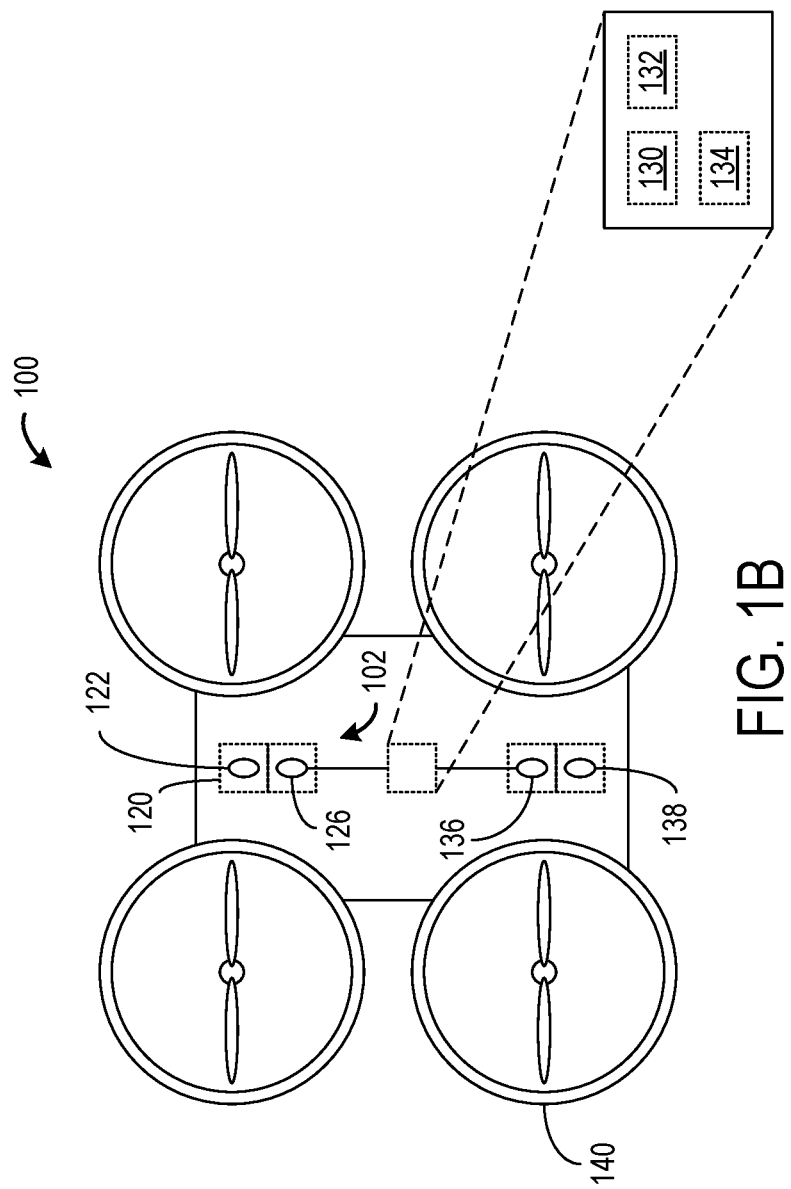

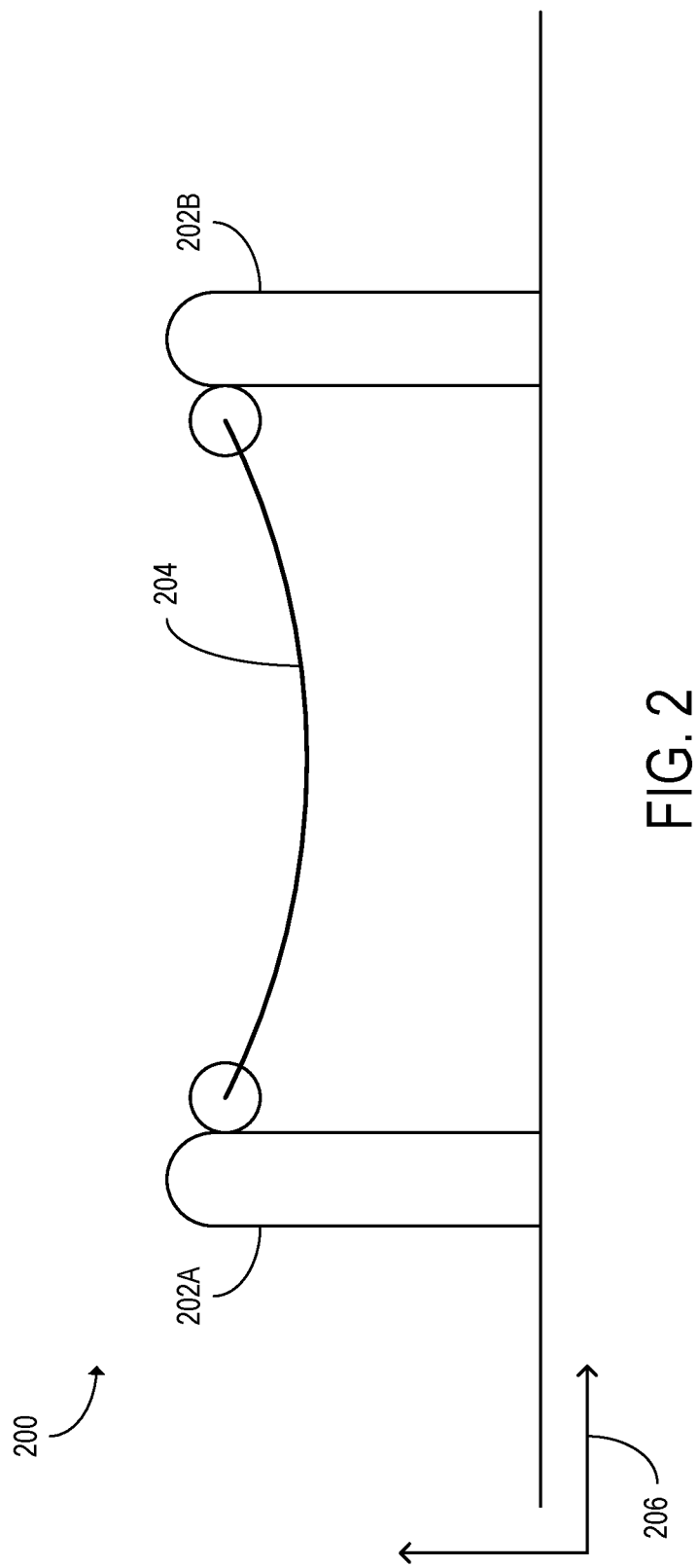

ANCHOR GRAPH

BACKGROUND

Augmented reality devices display graphical images superimposed over a user's view of a physical environment. The graphical images may be world locked to appear as if they are affixed to an object in the physical world. To accurately position these graphical images so as to appear world locked, an augmented reality device continually estimates its pose (position and orientation) within the physical environment. One source of data that the augmented reality device may use to estimate its pose is optical feature data in captured images of the physical environment. The augmented reality device identifies optical features in the captured image data as anchor points. These anchor points are not expected to physically move in the physical environment. However, as the augmented reality device moves through the physical environment, the position of the anchor points will change in the frames of captured image data. The relative movement of the anchor points in successive frames of captured image data can be used to help determine a corresponding relative movement of the augmented reality device within the physical environment, so that an updated pose of the augmented reality device can be computed for a current frame. However, the estimated positions of the anchor points may be inaccurate, due to error in the sensor data itself and in the computations to recognize the optical features. As the estimated positions are recomputed at each frame, the anchor points may appear to drift due to these errors. When simulating large objects or objects that are located far away from the augmented reality device, even a small error in the position of an anchor point that is close to the augmented reality device can be compounded and produce a substantially large adverse visual effect in a portion of the object that is located a significant distance from the augmented reality device.

SUMMARY

A computing system is provided, including at least one imaging sensor configured to collect imaging data of a physical environment. The computing system may further include a processor configured to generate, based on the imaging data, a first anchor graph including a first plurality of anchors connected by a first plurality of edges. Each anchor of the first plurality of anchors may indicate a respective estimated position in the physical environment. The processor may be further configured to detect a change in the estimated position of at least one anchor of the first plurality of anchors relative to the at least one imaging sensor. Based on the change in the estimated position, the processor may be further configured to reposition the first anchor graph relative to the at least one imaging sensor. Estimated lengths of the first plurality of edges and estimated angles between the first plurality of edges may remain fixed.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 1B shows a computing system in the form of a robot, according to another embodiment of the present disclosure.

FIGS. 2-7 shows an example physical environment in which a virtual rope is simulated.

DETAILED DESCRIPTION

Figure 1A:
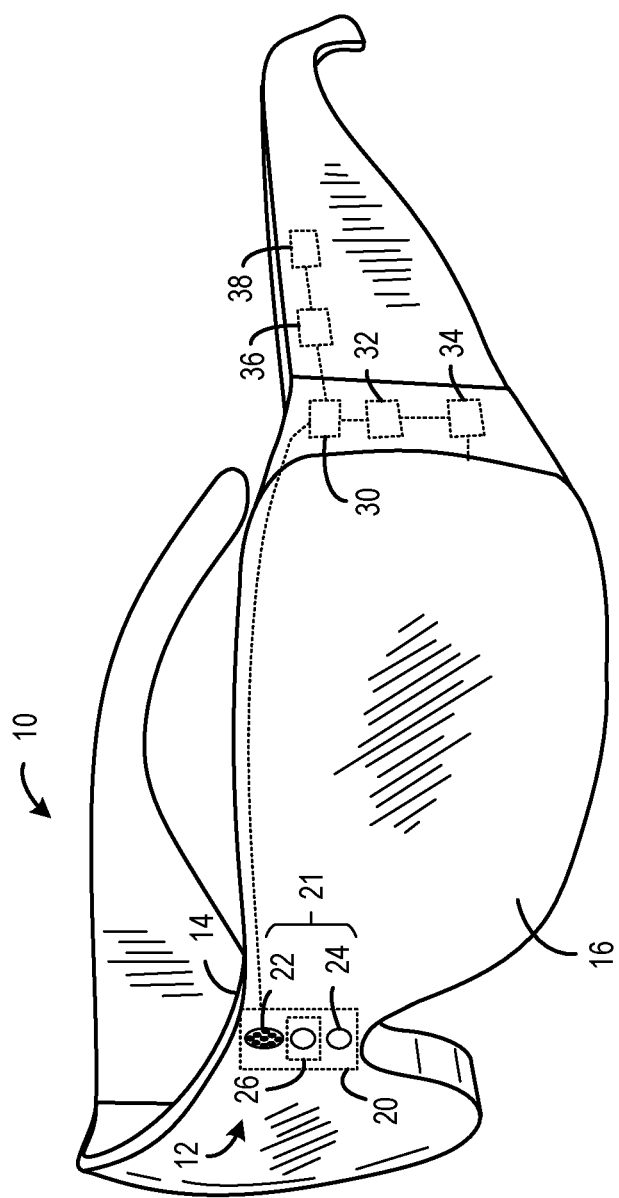
FIG. 1A shows a computing system in the form of a head-mounted display device, according to one embodiment of the present disclosure.

In order to address the problems discussed above, a computing system is provided. FIG. 1A illustrates an example computing system in the form of a head-mounted display device 10. The illustrated head-mounted display device 10 takes the form of wearable glasses or goggles, but it will be appreciated that other forms are possible. The head-mounted display device 10 may include an output device suite 14 including a display 16. In some embodiments, the head-mounted display device 10 may be configured in an augmented reality configuration to present an augmented reality environment, and thus the display 16 may be an at least partially see-through stereoscopic display configured to visually augment an appearance of a physical environment being viewed by the user through the display 16. In some examples, the display 16 may include one or more regions that are transparent (e.g. optically clear) and may include one or more regions that are opaque or semi-transparent. In other examples, the display 16 may be transparent (e.g. optically clear) across an entire usable display surface of the display 16.

Alternatively, the head-mounted display device 10 may be configured in a virtual reality configuration to present a full virtual reality environment, and thus the display 16 may be a non-see-though stereoscopic display. The head-mounted display device 10 may be configured to display virtual three-dimensional environments to the user via the non-see-through stereoscopic display. The head-mounted display device 10 may be configured to display a virtual representation such as a three-dimensional graphical rendering of the physical environment in front of the user that may include additional virtual objects. Displaying the virtual representation of the physical environment may include generating a two-dimensional projection of a three-dimensional model of the physical environment onto the surface of the display 16. As another alternative, the computing system may include a portable computing device that is not head mounted, such as a smartphone or tablet computing device. In such a device, camera-based augmented reality may be achieved by capturing an image of the physical environment through a forward facing camera and displaying the captured image on a user-facing display along with world locked graphical images superimposed on the captured image. While the computing system is primarily described in terms of the head-mounted display device 10 herein, it will be appreciated that many features of the head-mounted display device 10 are also applicable to such a portable computing device that is not head mounted.

Returning to the head-mounted example, the output device suite 14 of the head-mounted display device 10 may, for example, include an image production system that is configured to display virtual objects to the user with the display 16. In the augmented reality configuration with an at least partially see-through display, the virtual objects are visually superimposed onto the physical environment that is visible through the display 16 so as to be perceived at various depths and locations. In the virtual reality configuration, the image production system may be configured to display virtual objects to the user with a non-see-through stereoscopic display, such that the virtual objects are perceived to be at various depths and locations relative to one another. In one embodiment, the head-mounted display device 10 may use stereoscopy to visually place a virtual object at a desired depth by displaying separate images of the virtual object to both of the user's eyes. Using this stereoscopy technique, the head-mounted display device 10 may control the displayed images of the virtual objects, such that the user will perceive that the virtual objects exist at a desired depth and location in the viewed physical environment.

The head-mounted display device 10 may include an input device suite 12, including one or more input devices. The input devices may include one or more optical sensors and one or more position sensors, which are discussed in further detail below. Additionally or alternatively, the input devices may include user input devices such as one or more buttons, control sticks, microphones, touch-sensitive input devices, or other types of input devices.

The input device suite 12 of the head-mounted display device 10 may include one or more imaging sensors 21. In one example, the input device suite 12 includes an outward-facing optical sensor 22 that may be configured to detect the real-world background from a similar vantage point (e.g., line of sight) as observed by the user through the display 16 in an augmented reality configuration. The input device suite 12 may additionally include an inward-facing optical sensor 24 that may be configured to detect a gaze direction of the user's eye. It will be appreciated that the outward facing optical sensor 22 and/or the inward-facing optical sensor 24 may include one or more component sensors, including an RGB camera and a depth camera. The RGB camera may be a high definition camera or have another resolution. The depth camera may be configured to project non-visible light and capture reflections of the projected light, and based thereon, generate an image comprised of measured depth data for each pixel in the image. This depth data may be combined with color information from the image captured by the RGB camera, into a single image representation including both color data and depth data, if desired.

The head-mounted display device 10 may further include a position sensor system 26 that may include one or more position sensors such as accelerometer(s), gyroscope(s), magnetometer(s), global positioning system(s), multilateration tracker(s), and/or other sensors that output position sensor information useable as a position, orientation, and/or movement of the relevant sensor.

Optical sensor information received from the one or more imaging sensors 21 and/or position sensor information received from position sensors may be used to assess a position and orientation of the vantage point of head-mounted display device 10 relative to other environmental objects. In some embodiments, the position and orientation of the vantage point may be characterized with six degrees of freedom (e.g., world-space X, Y, Z, pitch, roll, yaw). The vantage point may be characterized globally or independent of the real-world background. The position and/or orientation may be determined with an on-board computing system and/or an off-board computing system, which may include a processor 30, a volatile storage device 32, and/or a non-volatile storage device 34.

Furthermore, the optical sensor information and the position sensor information may be used by the computing system to perform analysis of the real-world background, such as depth analysis, surface reconstruction, environmental color and lighting analysis, or other suitable operations. In particular, the optical and positional sensor information may be used to create a virtual model of the real-world background. In some embodiments, the position and orientation of the vantage point may be characterized relative to this virtual space. Moreover, the virtual model may be used to determine positions of virtual objects in the virtual space and add additional virtual objects to be displayed to the user at a desired depth and location within the virtual world. The virtual model is a three-dimensional model and may be referred to as "world space," and may be contrasted with the projection of world space viewable on the display, which is referred to as "screen space." Additionally, the optical sensor information received from the one or more imaging sensors 21 may be used to identify and track objects in the field of view of the one or more imaging sensors 21. The optical sensors may also be used to identify machine recognizable visual features in the physical environment, and use the relative movement of those features in successive frames to compute a frame to frame relative pose change for the head mounted display device 10 within the world space of the virtual model.

The head-mounted display device 10 may further include a communication system, which may include one or more receivers 36 and/or one or more transmitters 38. In embodiments in which the head-mounted display device 10 communicates with an off-board computing system, the one or more receivers 36 may be configured to receive data from the off-board computing system, and the one or more transmitters 38 may be configured to send data to the off-board computing system. In some embodiments, the head-mounted display device 10 may communicate with the off-board computing system via a wireless local- or wide-area network. Additionally or alternatively, the head-mounted display device 10 may communicate with the off-board computing system via a wired connection.

FIG. 1B shows a computing system according to another embodiment of the present disclosure. In the embodiment of FIG. 1B, the computing system has the form of a robot 100, shown here as an unmanned aerial vehicle. It is appreciated that the robot may have other forms in some embodiments and is not limited to the unmanned aerial vehicle shown in FIG. 1B.

The robot 100 may include an input device suite 102, including one or more input devices. As in the embodiment of FIG. 1A, the input devices may include one or more imaging sensors 122 and one or more position sensors 126. The one or more imaging sensors 122 may include one or more component sensors, including an RGB camera and a depth camera. The one or more position sensors 126 may include one or more accelerometer(s), gyroscope(s), magnetometer(s), global positioning system(s), multilateration tracker(s), and/or other sensors.

The robot 100 may further include a processor 130, a volatile storage device 132, and/or a non-volatile storage device 134. In some embodiments, the functions of one or more of the processor 130, the volatile storage device 132, and/or the non-volatile storage device 134 may be performed by an off-board computing system. In such embodiments, the robot 100 may communicate with the off-board computing system as described above with reference to FIG. 1A. In such embodiments, the robot 100 may include a communication system including one or more receivers 136 and/or one or more transmitters 138.

The robot 100 may include a propulsion system 140 that allows the robot 100 to move through the physical environment. In FIG. 1B, the propulsion system 140 is shown as including four impellers, which may be driven by one or more motors. However, other configurations of the propulsion system 140 are also contemplated. For example, the propulsion system may include some other number of impellers, and may additionally or alternatively include one or more wheels, treads, or other propulsion devices. In some embodiments, at least a part of the robot 100 may be fixed relative to the physical environment.

Shortcomings of existing methods of anchoring a virtual object in a physical environment are shown with reference to FIGS. 2-7. FIGS. 2-7 show an example of a physical environment 200 including a first post 202A and a second post 202B between which a virtual rope 204 is simulated. In this example, the virtual rope 204 is displayed as a virtual object in an augmented reality environment, and the posts are physical objects in the environment. The virtual rope 204 may have a reference frame 206 that indicates that the first post 202A and the second post 202B are endpoints of the virtual rope 204.

Figure 3:
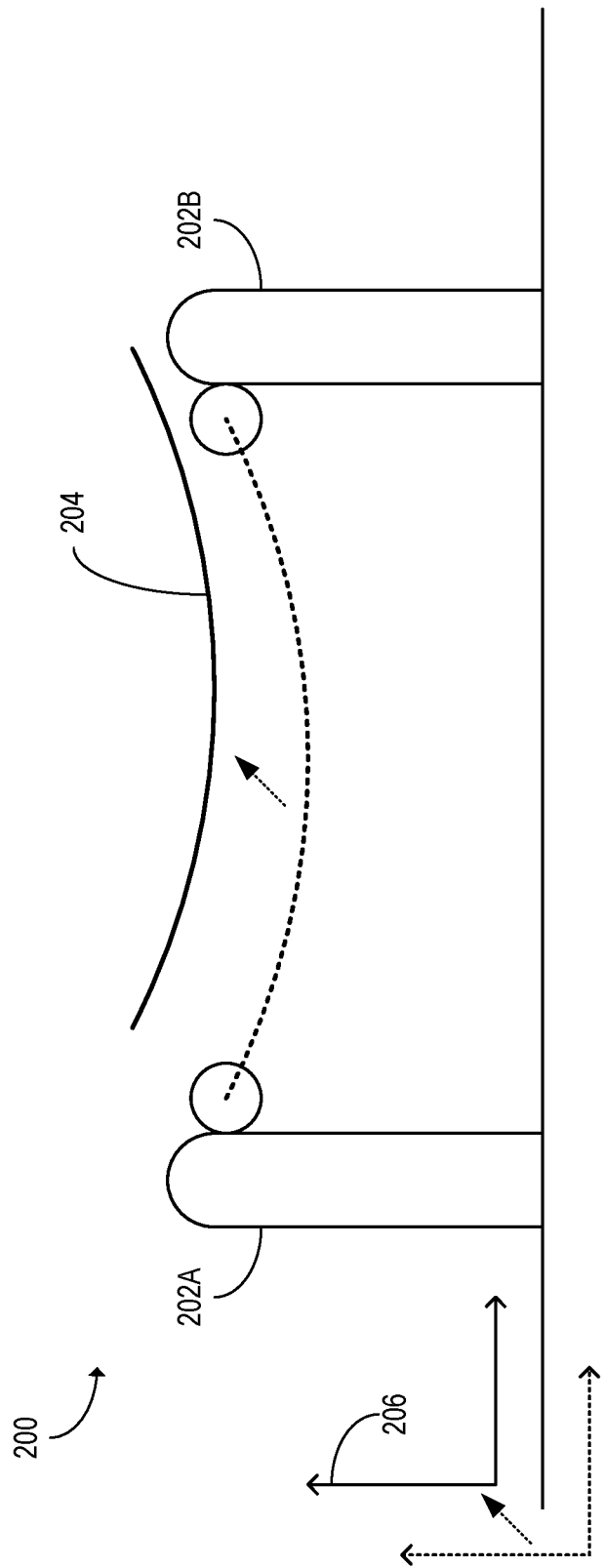

FIG. 2 shows an initial position of the virtual rope 204. In FIG. 3, the physical environment 200 and the virtual rope 204 are shown after the reference frame 206 of the virtual rope 204 has moved from the position at which is it displayed in FIG. 2. As shown in FIG. 3, if the relative positions in screen space of the virtual rope 204 and end posts 202A, 202B are not updated, the movement of the reference frame 206 may cause the virtual rope 204 to be displayed such that the endpoints of the virtual rope 204 are not located at the first post 202A and the second post 202B. This movement may be due to movement of the one or more imaging sensors relative to the physical environment. When the one or more imaging sensors 21 move relative to the physical environment, the estimated position(s) and orientation(s) (pose) of the one or more imaging sensors 21 in the three-dimensional representation of the physical environment may be updated. The objects in world space are then projected to screen space using this updated camera pose for the imaging sensors 21. It is a goal of such updating of the pose to world lock the rope such that its end points in screen space appear locked to the images of the end posts 202A, 202B.

Figure 4:
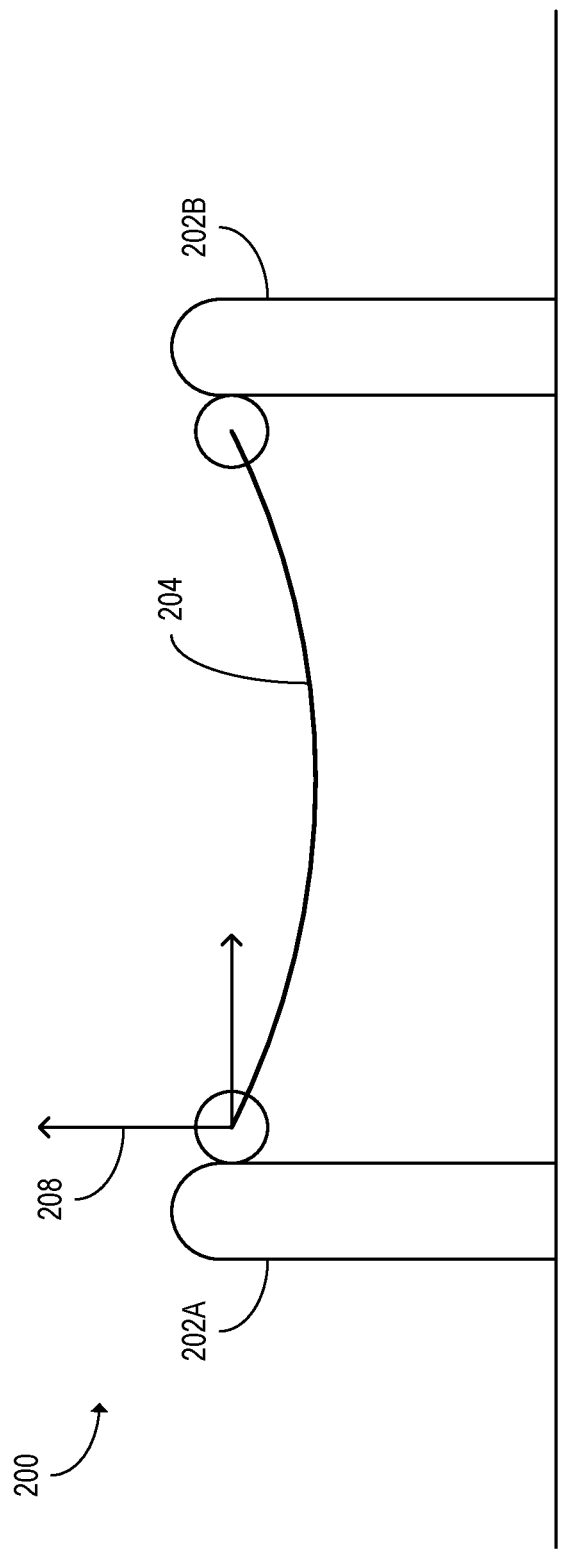
Figure 5:
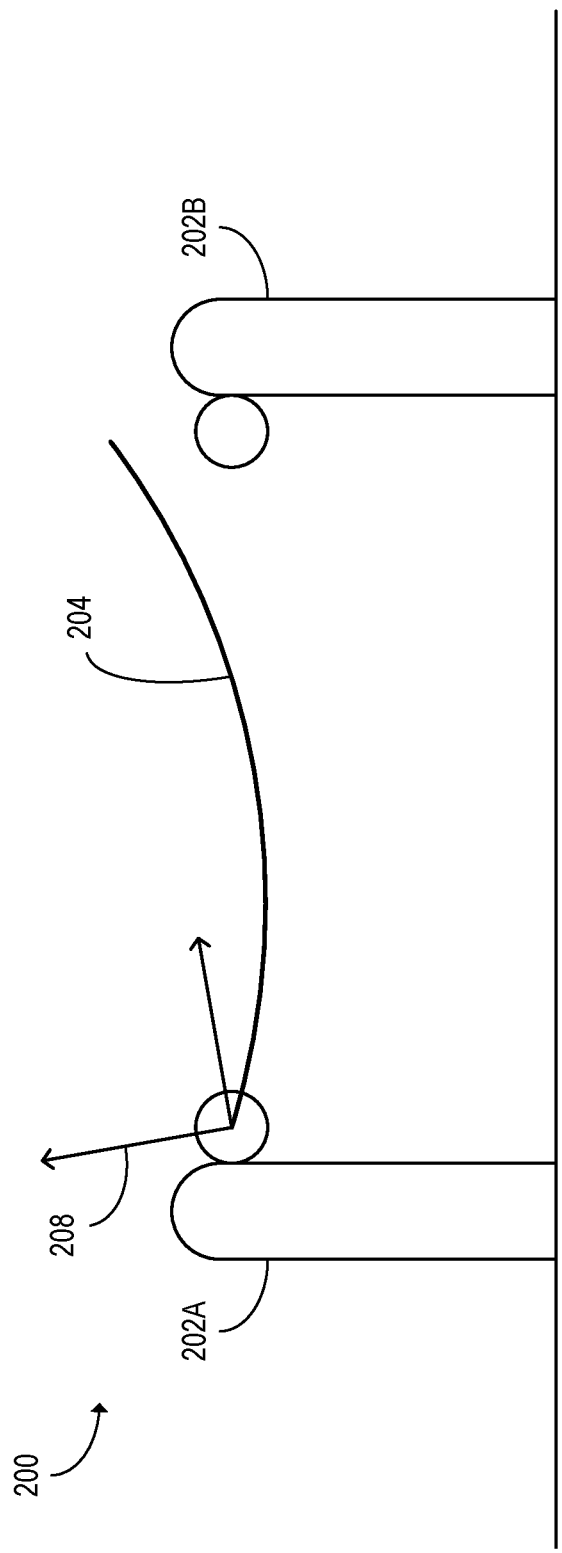

FIG. 4 shows the physical environment 200 and the virtual rope 204, wherein one endpoint of the virtual rope 204 is anchored at the first post 202A. As shown in FIG. 4, the first post 202A may be the origin of a first anchored reference frame 208. Thus, a first endpoint of the virtual rope 204 may be anchored to the first post 202A such that the location of the first endpoint in the physical environment 200 does not change over time. However, as shown in FIG. 5, when a pose of the first anchored reference frame 208 is adjusted, the first anchored reference frame 208 may move in some way, such as rotating around its origin as depicted. A second endpoint of the virtual rope 204 may therefore move away from the second post 202B. The movement of first anchored reference frame 208 may be caused, for example, by drift in the estimated position and orientation of the machine recognizable visual feature upon which anchored reference frame 208 is anchored in world space. This drift may be caused by one or more of (1) variations in the impinging light upon imaging sensor 21 that result in varied pixel representation of the visual feature in the captured image, and (2) differences in the way that such pixel representations of the visual feature are processed by optical feature recognition algorithms. These two differences may combine to produce the effect that the estimated pose in world space of the anchor point for the anchored frame of reference 208 varies from frame to frame, and thus appears to drift over time. This effect is also visible in screen space.

Figure 6:
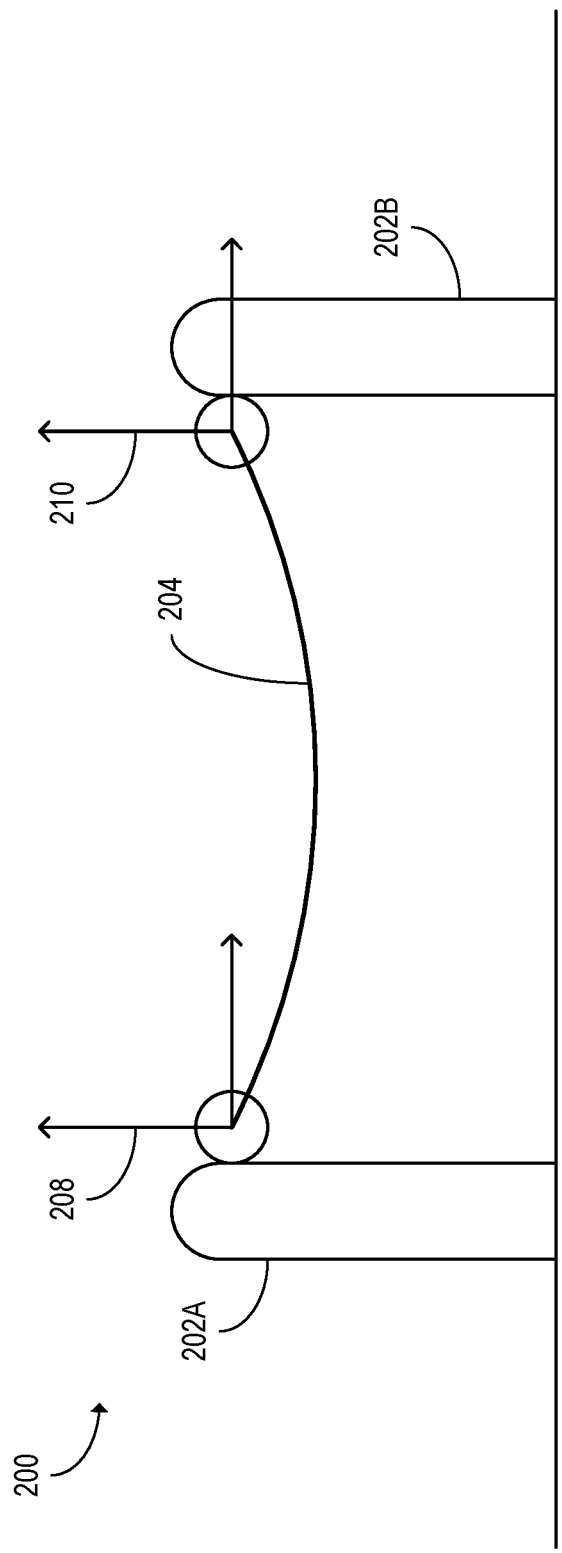
Figure 7:
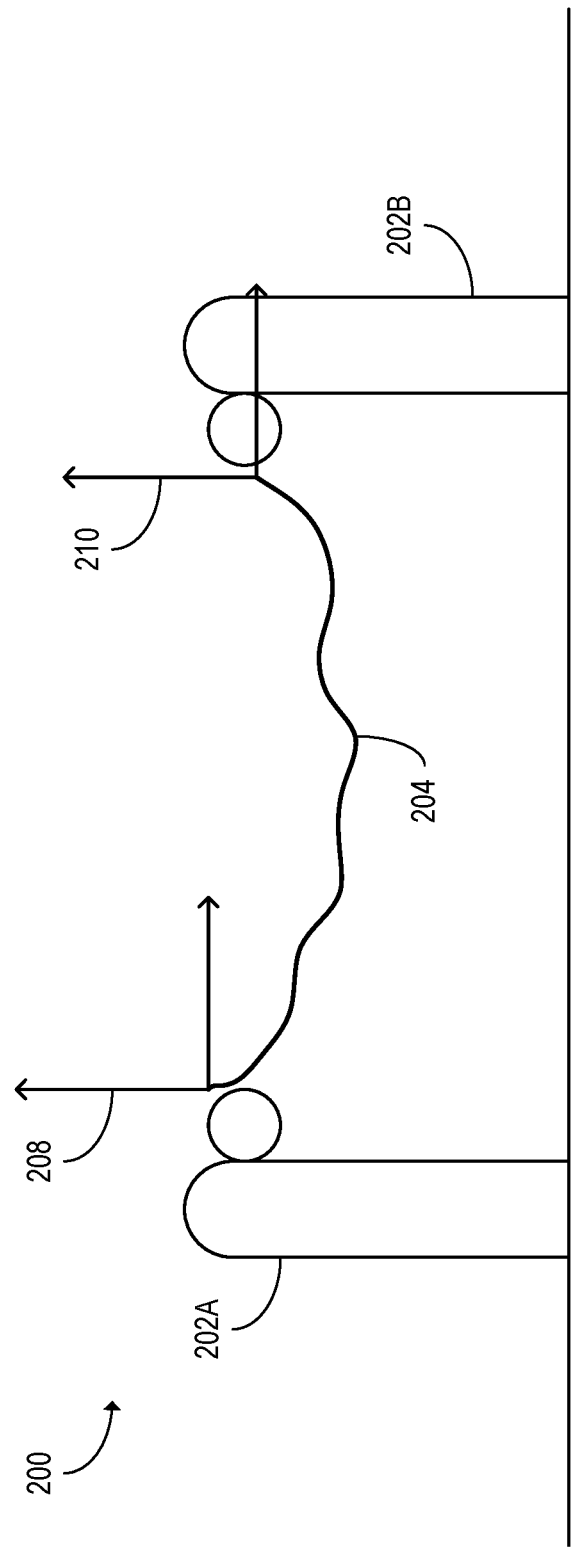

In order to avoid having the second endpoint of the virtual rope 204 move away from the second post 202B when the frame of reference has drifted to a different pose as shown in FIG. 5, a second anchored reference frame 210 of the second endpoint may be located at the second post 202B, as shown in FIG. 6. The poses of the first anchored reference frame 208 and the second anchored reference frame 210 may be adjusted independently. However, as shown in FIG. 7, adjusting the poses of the first anchored reference frame 208 and the second anchored reference frame 210 independently may produce a phantom physical interaction with the virtual rope 204, as each of the anchored reference frames 208, 210 independently drifts. The movement of the anchor points is akin to the space of the physical environment itself being warped, since the physical model on which the anchor points are built supposes that the anchor points do not move in the physical environment. In the example of FIG. 7, the phantom physical interaction is depicted as a loosening of the virtual rope 204 that occurs due to a decrease in the distance between the origin of the first anchored reference frame 208 and the origin of the second anchored reference frame 210.

Figure 8:
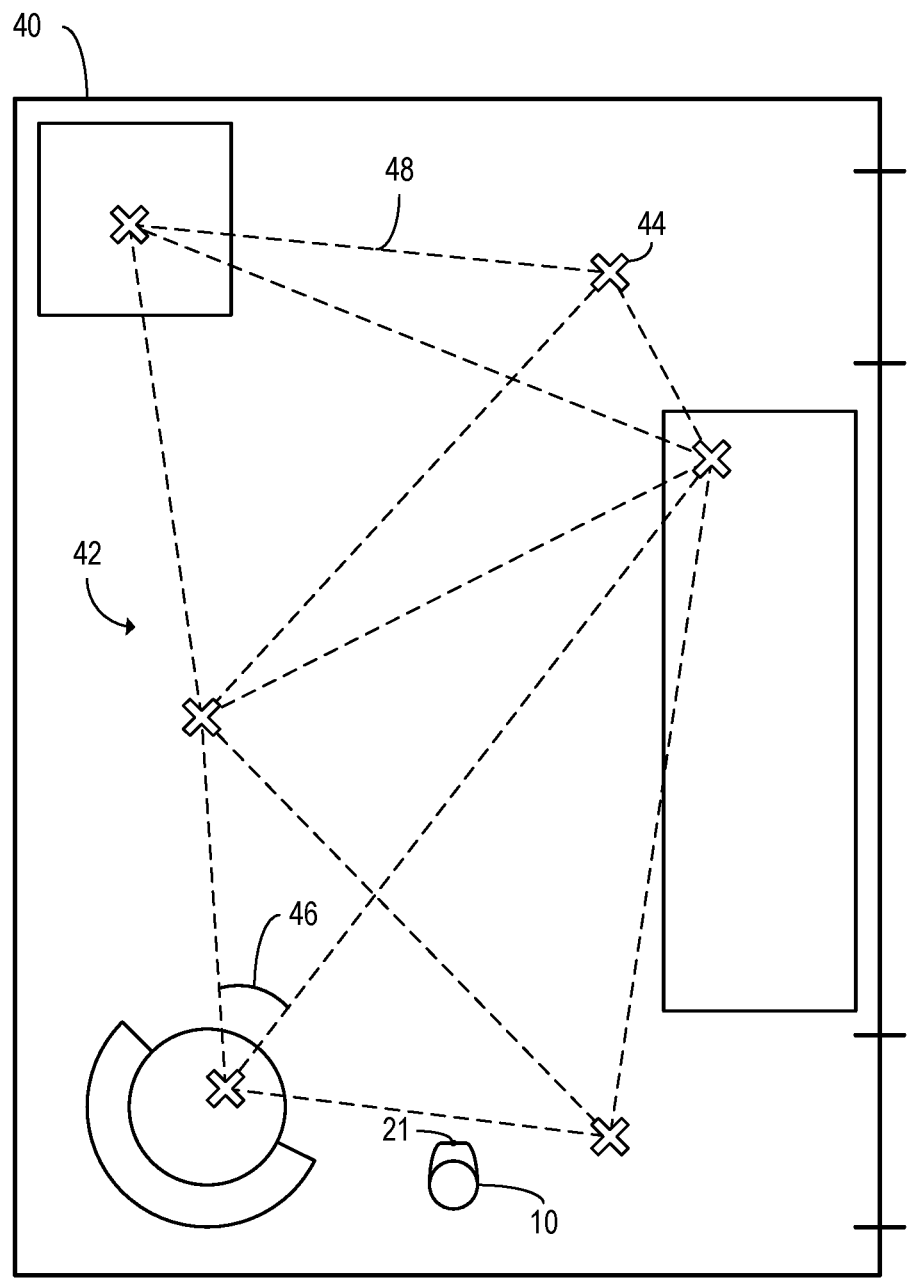
FIGS. 8-16 show an example physical environment in which a plurality of anchors are located, according to the embodiment of FIG. 1A.

An example solution to the phantom physical interaction problem caused by anchor point drift as discussed above with reference to FIGS. 2-7 is provided below with reference to FIGS. 8-16. FIG. 8 shows an example physical environment 40 in which a computing system is situated. As shown in FIGS. 8-16, the computing system comprises the head-mounted display device 10 of FIG. 1A. Alternatively, the computing system may be the robot 100 of FIG. 1B, or some other computing system. In addition to the head-mounted display device 10 shown in FIG. 8, the computing system may include components located away from the physical environment 40, as discussed above with reference to FIG. 1A.

The head-mounted display device 10 as shown in FIG. 8 includes one or more imaging sensors 21 configured to collect imaging data of the physical environment 40. The one or more imaging sensors 21 may be included in the input device suite 12 of the head-mounted display device 10, as shown in FIG. 1A.

The head-mounted display device 10 may further include a processor 30. The processor 30 may be configured to generate, based on the imaging data, a first anchor graph 42 including a first plurality of anchors 44 connected by a first plurality of edges 48. Each anchor 44 of the first plurality of anchors 44 may indicate a respective estimated position in the physical environment 40. The processor 30 may identify a plurality of features in the physical environment 40, such as edges of objects, to indicate with the anchors 44. In some embodiments, the processor 30 may identify one or more tags placed in the physical environment 40 as locations for the anchors 44. Preferably, the anchors 44 have fixed locations relative to each other. The first anchor graph 42 may further include indications of an estimated length of each respective edge 48 and/or an estimated angle 46 between each of one or more pairs of edges 48.

The one or more imaging sensors 21 may be configured to transmit the imaging data to the processor 30 in timesteps separated by a predetermined time interval. The processor 30 may generate the first anchor graph 42 in a single timestep or over a plurality of timesteps.

In some embodiments, one or more virtual objects may be displayed on the display 16 of the head-mounted display device 10 at one or more locations in the physical environment 40 that are determined with reference to the first plurality of anchors 44. Additionally or alternatively, the processor 30 may generate other outputs based at least in part on the first plurality of anchors 44, such as a trajectory through the physical environment 40. The processor 30 may be configured to execute a physics engine that utilizes the locations of the anchors 44.

Figure 9:
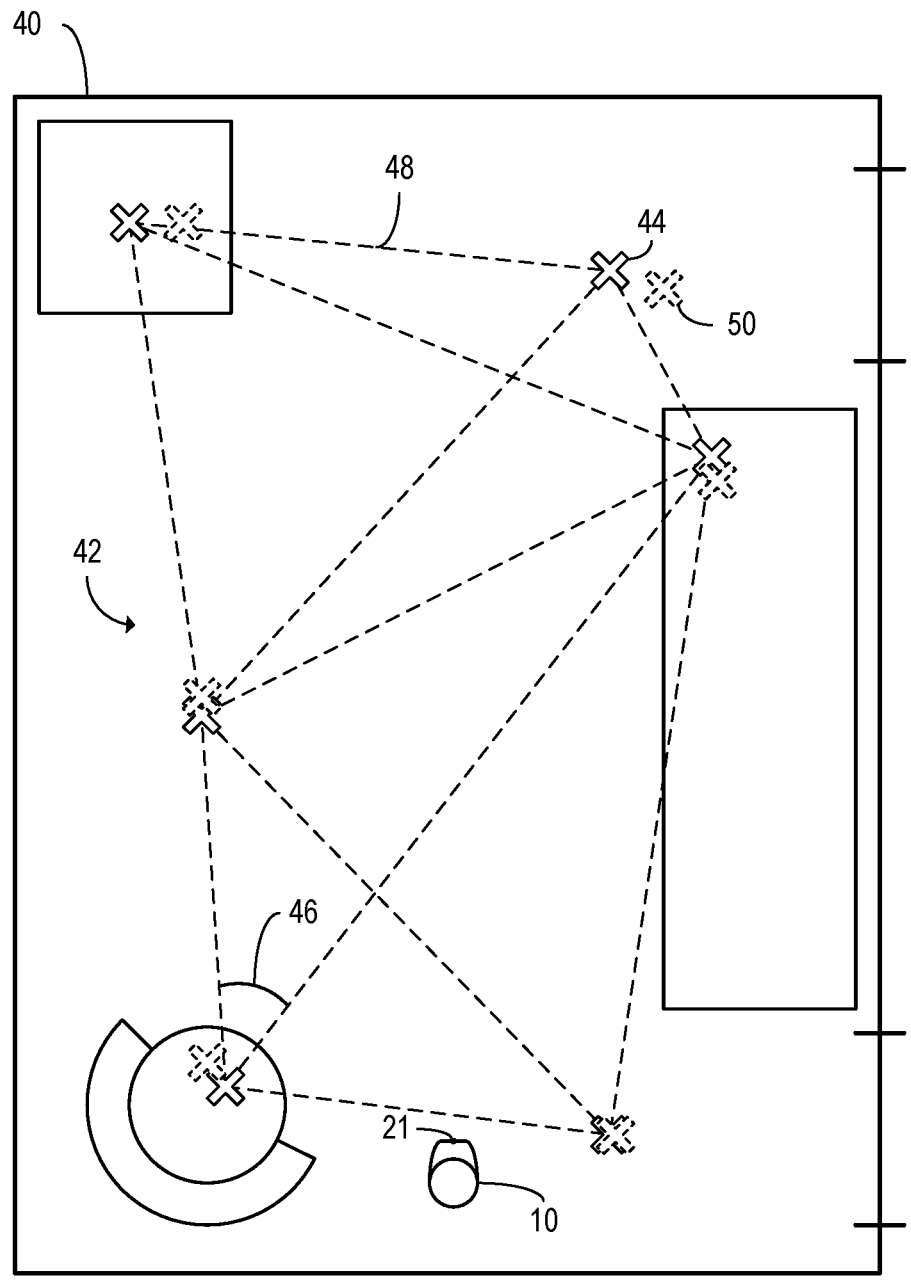

The estimated locations of the first plurality of anchors 44 may change over time, for example, due to movement of the head-mounted display device 10 relative to the physical environment 40 and/or error in the imaging data collected by the one or more imaging sensors 21. The processor 30 may be further configured to detect a change in the estimated position of at least one anchor 44 of the first plurality of anchors 44 relative to the one or more imaging sensors 21. FIG. 9 shows a first plurality of new estimated positions 50 of the anchors 44, which are the positions of the anchors 44 after the change.

Possible sources of error in the positions of the first plurality of anchors 44 are described with reference to FIG. 9. In timesteps following the initial determination of the position of each of the first plurality of anchors 44, the processor 30 may determine an updated position estimate for each anchor 44 based at least in part on imaging data received since the first anchor graph 42 was initially generated. The processor 30 may identify, in the later-received imaging data, at least some features of the plurality of features in the physical environment 40 that were initially identified when defining the first plurality of anchors 44. In some embodiments, the processor 30 may determine the updated position estimate for each anchor 44 based on imaging data of an area within some predetermined distance of the previous estimated position of the anchor 44. Thus, the processor 30 may reduce the amount of computation performed to update the position of the anchor 44. In some embodiments, the processor 30 may also use position sensor information received from the position sensor system 26 to determine the updated location estimate for each anchor 44. For example, the processor 30 may determine that the position sensor information indicates a change in position of a user's head. The processor 30 may compare the imaging data to the position sensor information when determining the updated position estimates of the anchors 44.

When the processor determines the updated position estimates of the first plurality of anchors 44, the processor 30 may apply a compression algorithm to the imaging data in order to reduce the amount of computation performed when updating the position estimates. In embodiments in which a compression algorithm is applied to the imaging data, applying the compression algorithm may introduce error into the updated position estimates. In addition, in embodiments in which the processor 30 uses position sensor information collected by the position sensor system 26 when updating the position estimates of the first plurality of anchors 44, discrepancies between the position sensor information and the imaging data may occur. The error in the estimated position may also be caused by different light impinging on the imaging sensor and producing variations in the captured image of the visual feature, and due to the manner in which the optical feature recognition algorithm processes the pixel data in the captured image to identify the visual feature that serves to anchor each anchor point, as described above. Typically, the error in the updated position estimates is an error in the position in world space, which also may be visible in screen space. However, the degree to which the error is visible may vary depending on the viewpoint of the user, i.e., the pose of the head mounted display device 10.

Figure 10:
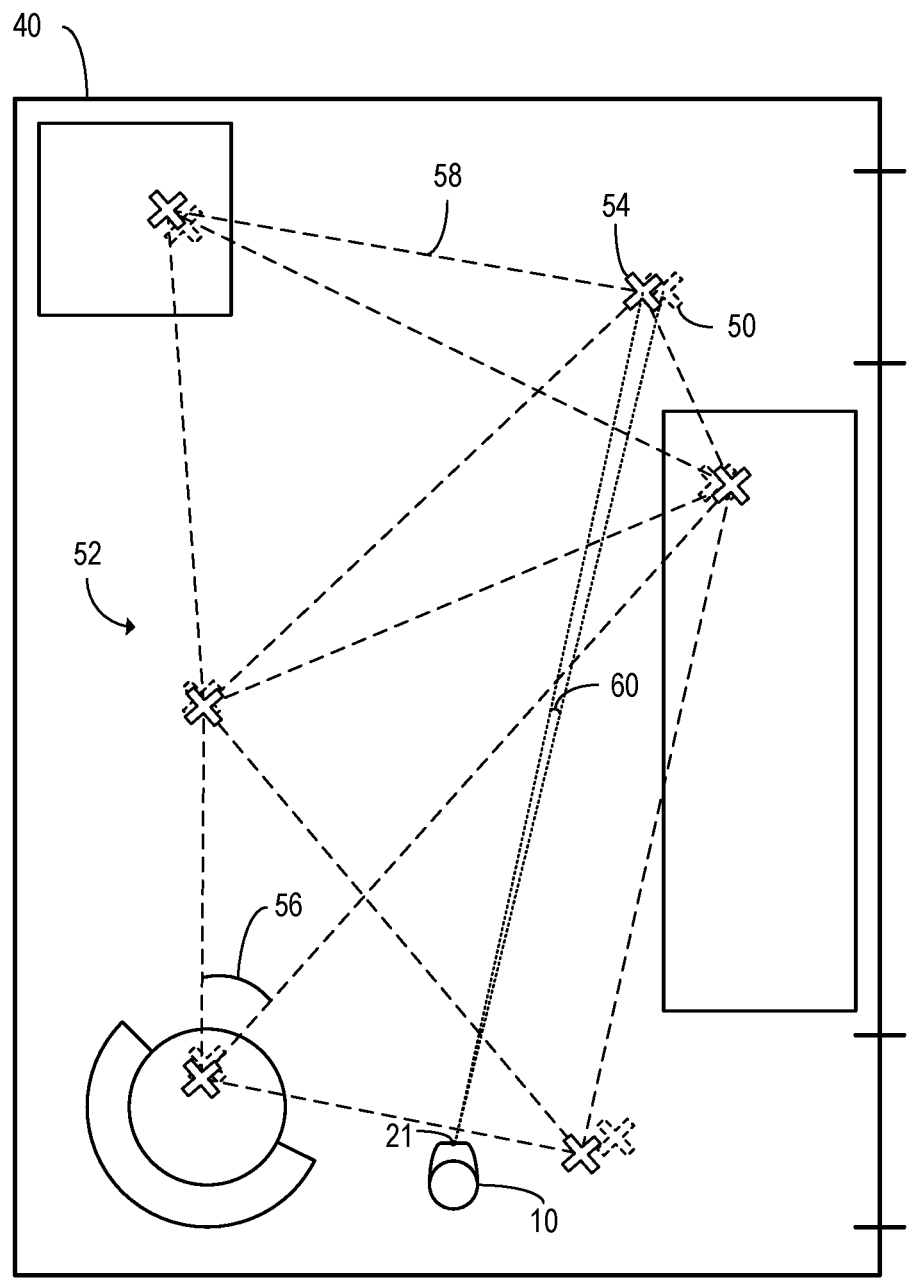

Based on the change in the estimated position of the at least one anchor 44, the processor 30 may be further configured to reposition the first anchor graph 42 relative to the one or more imaging sensors 21. FIG. 10 shows a repositioned first anchor graph 52 including a first plurality of repositioned anchors 54. The first plurality of repositioned anchors 54 may be connected by a first plurality of repositioned edges 58. A first plurality of estimated repositioned angles 56 may be formed by respective pairs of repositioned edges 58. In some embodiments, the processor 30 may reposition the first anchor graph 42 at least in part by translating the first anchor graph 42.

Additionally or alternatively to translating the first anchor graph 42, the processor 30 may reposition the first anchor graph 42 at least in part by rotating the first anchor graph 42. The repositioned first anchor graph 52 shown in FIG. 10 is the first anchor graph 42 of FIGS. 8 and 9 rotated by an angle 60. In some embodiments, the processor 30 may rotate the first anchor graph 42 at least in part by determining a best-fit angular orientation over the first plurality of anchors 44. The best-fit angular orientation may be an angular orientation at which the positions of the first plurality of anchors 44 most closely match the new estimated positions 50. For example, the processor 30 may use a least-squares algorithm to determine the best-fit angular orientation.

In some embodiments, the best-fit angular orientation may be a weighted best-fit angular orientation. In such embodiments, the processor 30 may determine a respective weight of each anchor 44 of the first plurality of anchors 44 based at least in part on an estimated distance between the anchor 44 and the one or more imaging sensors 21. For example, the processor 30 may weight an anchor 44 more highly if it is closer to the one or more imaging sensors 21. Additionally or alternatively, the processor 30 may determine a respective weight of each anchor 44 of the first plurality of anchors 44 based at least in part on a change in an estimated angular position of the anchor 44. The change in the estimated angular position of the anchor 44 may be a difference between the estimated angular position of the anchor 44 before and after the change in position. For example, the processor 30 may apply a least-squares algorithm to the changes in the estimated angular positions of the anchors 44. Additionally or alternatively, the processor 30 may reposition the first anchor graph 42 at least in part by applying a Bayesian updating algorithm to the respective positions of the anchors 44.

Figure 11:
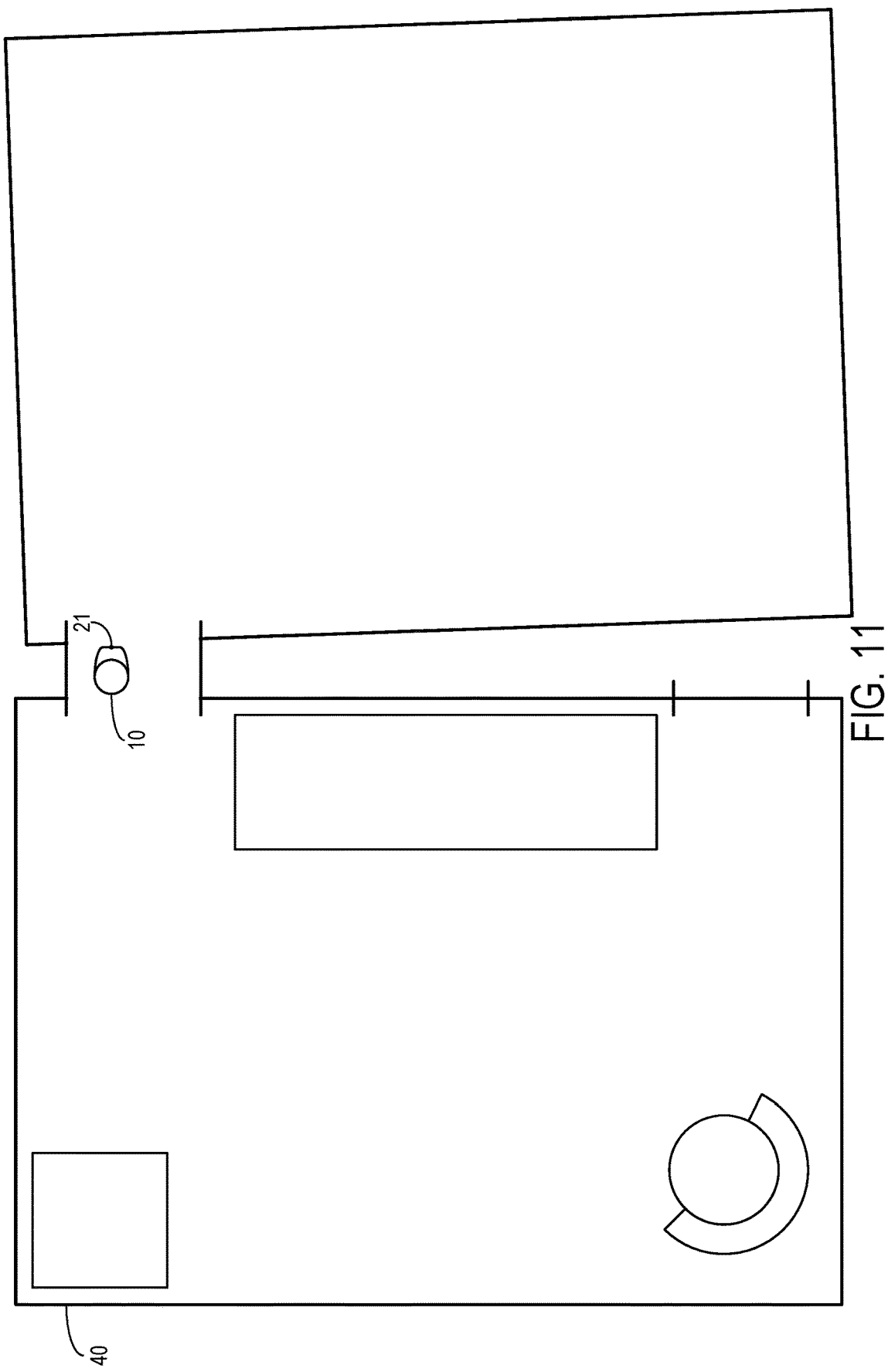
Figure 12:
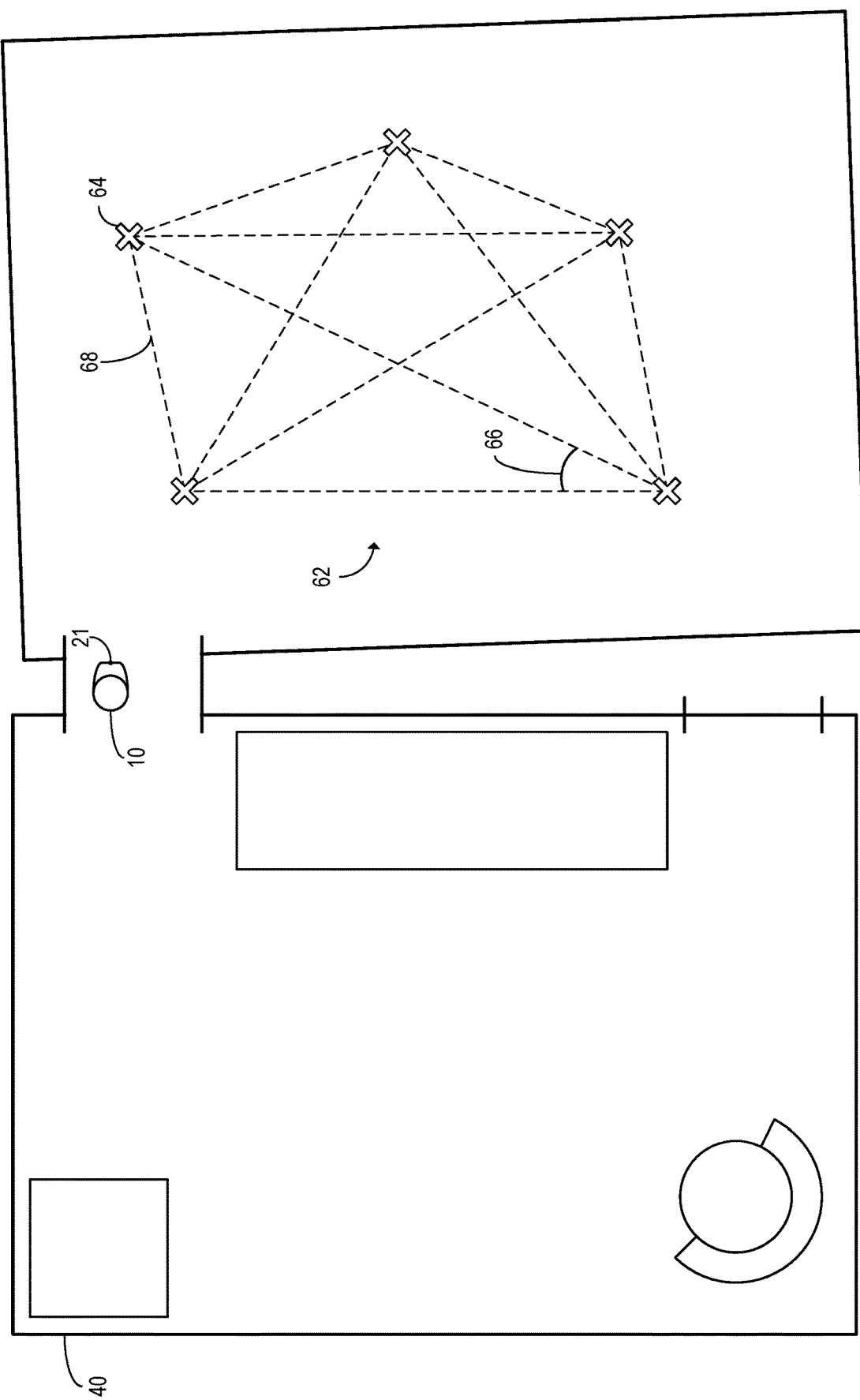

FIG. 11 shows the physical environment 40 and the head-mounted display device 10 when the head-mounted display device 10 moves into a new area of the physical environment 40. When the head-mounted display device 10 moves into the new area, the processor 30 may determine, based on the imaging data, that no anchors 44 included in the first plurality of anchors 44 are detected by the one or more imaging sensors 21. In response to this determination, the processor 30 may generate, based on the imaging data, a second anchor graph 62, as seen in FIG. 12. The second anchor graph 62 may include a second plurality of anchors 64 connected by a second plurality of edges 68. Each anchor 64 of the second plurality of anchors 64 may indicate a respective estimated position in the physical environment 40. In addition, a second plurality of estimated angles 66 may be formed by respective pairs of edges 68. The first plurality of anchors 44 and the second plurality of anchors 64 may be disjoint, i.e., no anchors are included in both the first plurality of anchors 44 and the second plurality of anchors 64. The processor 30 may generate the second anchor graph 62 in a single timestep or over a plurality of timesteps. In addition, the processor 30 may be further configured to reposition the second anchor graph 62 as described above for the first anchor graph 42.

Figure 13:
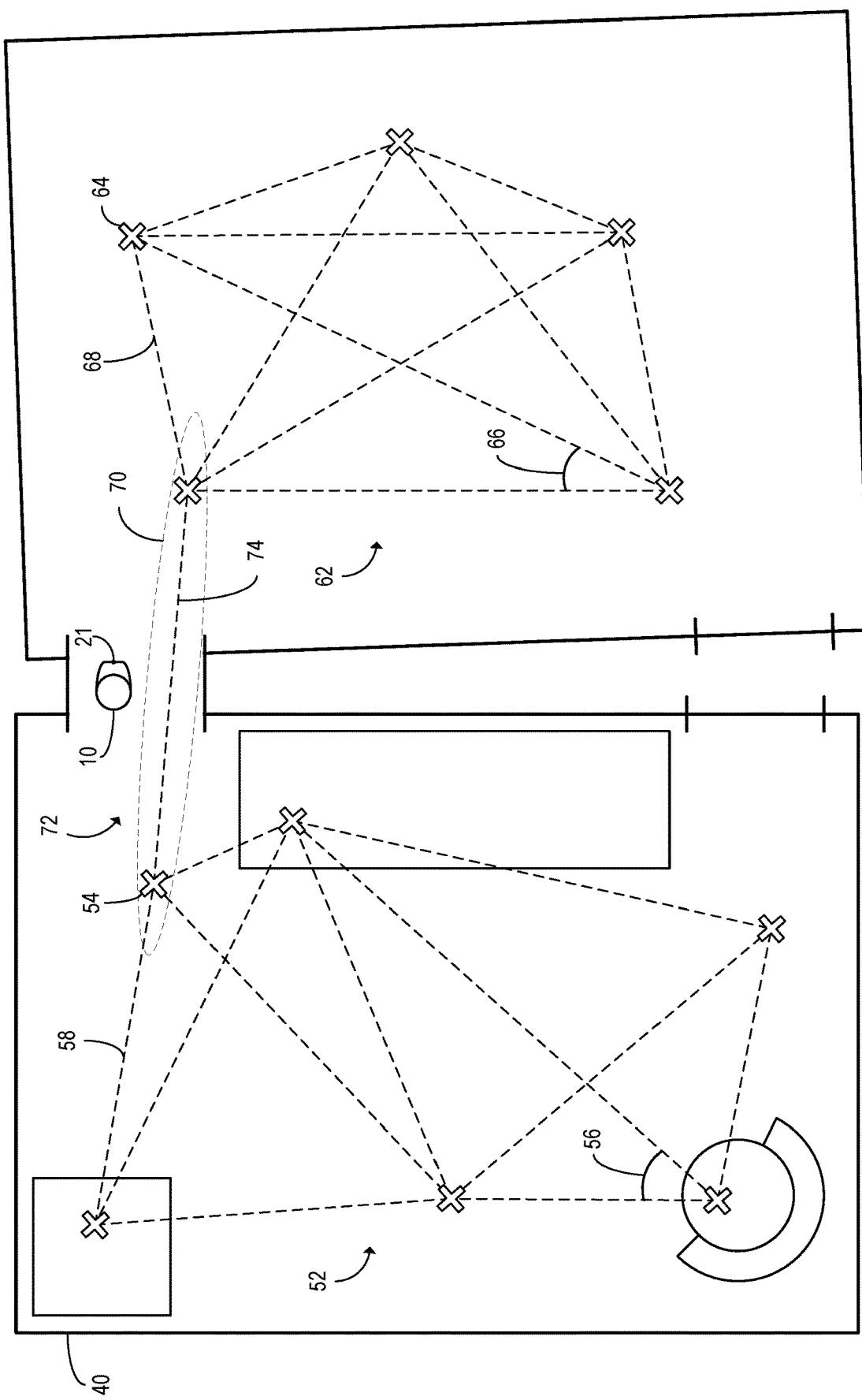

As shown in FIG. 13, subsequently to generating the second anchor graph 62, the processor 30 may be further configured to determine, based on the imaging data, that the one or more imaging sensors 21 have reestablished detection of at least one anchor 54 of the first plurality of repositioned anchors 54. Although, as shown in FIG. 13, the one or more imaging sensors 21 have reestablished detection of at least one repositioned anchor 54 of the first plurality of repositioned anchors 54, the processor 30 may, in some embodiments, reestablish detection of at least one anchor 44 of the first plurality of anchors 44 even if repositioning of the at least one anchor 44 has not previously been performed. Based on the determination that the one or more imaging sensors 21 have reestablished detection of the at least one repositioned anchor 54 of the first plurality of repositioned anchors 54, the processor 30 may generate a combined anchor graph 72 including each repositioned anchor 54 of the first plurality of repositioned anchors 54 and each anchor 64 of the second plurality of anchors 64. When generating the combined anchor graph 72, the processor 30 may determine a border region 70 that includes a repositioned anchor 54 of the repositioned first anchor graph 52 and an anchor 64 of the second anchor graph 62. In some embodiments, the border region 70 may further include additional anchors. The processor 30 may then connect the repositioned first anchor graph 52 and the second anchor graph 62 with a border edge 74 that connects the anchors in the border region 70.

Figure 14:
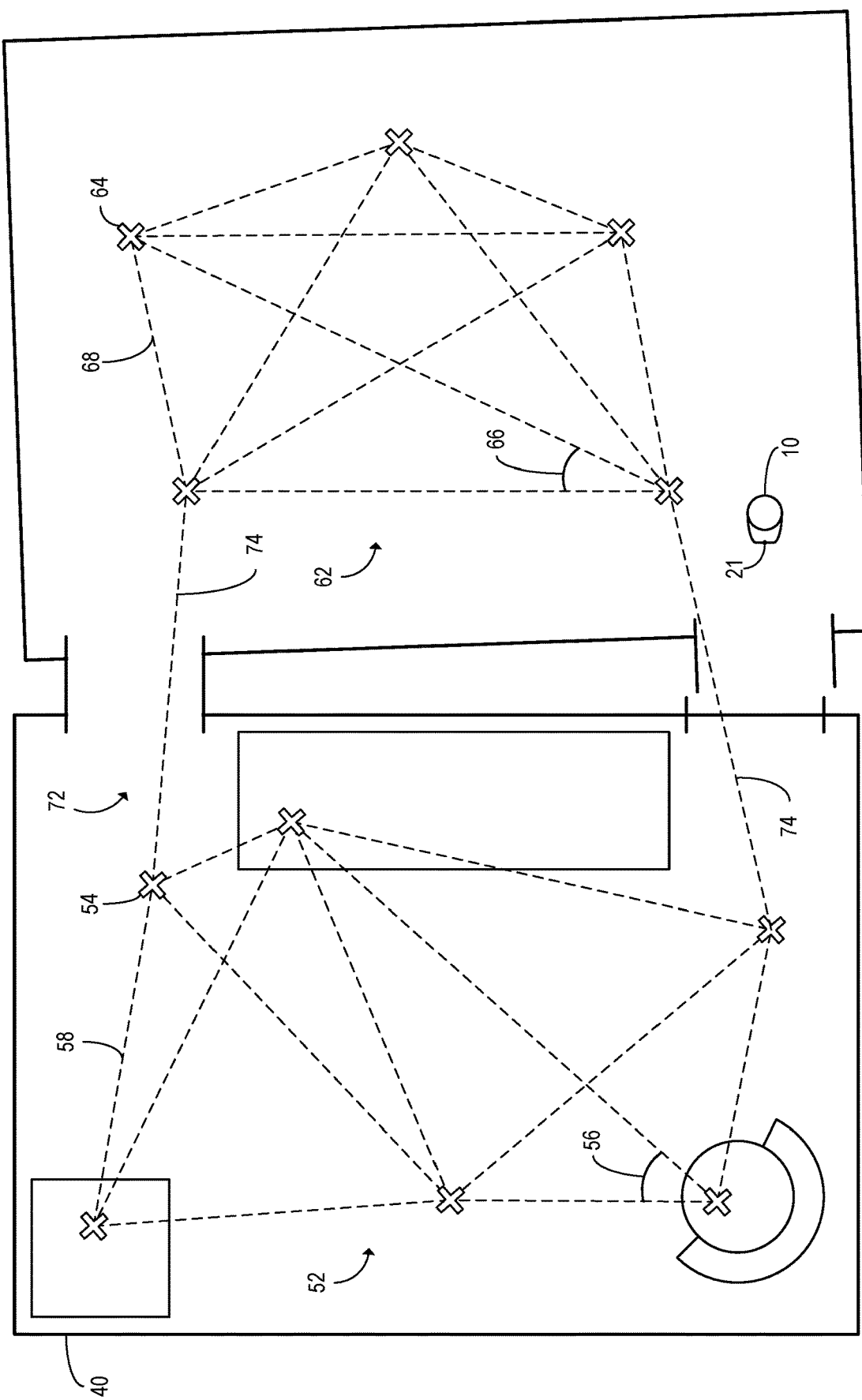
Figure 15:
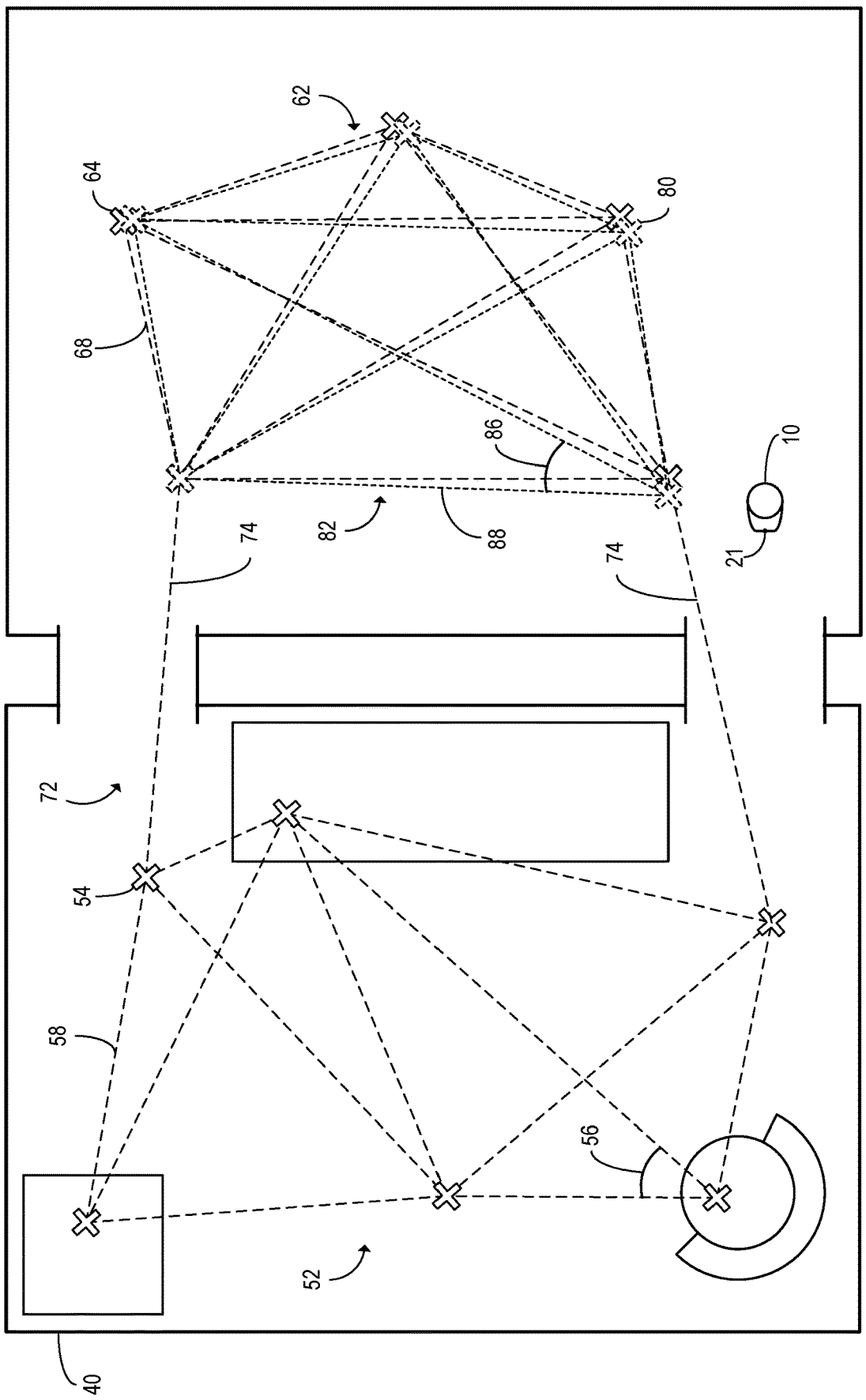

As shown in FIG. 14, the head-mounted display device 10 may subsequently move to a position in which the one or more imaging sensors 21 reestablishes detection of at least one additional anchor of the repositioned first anchor graph 52. The processor 30 may determine a border region 70 and connect the repositioned first anchor graph 52 and the second anchor graph 62 with a border edge 74 as described above with reference to FIG. 13. However, an inconsistency in the estimated angles between the edges may result. For example, a loop including one or more repositioned anchors 54 of the repositioned first anchor graph 52 and one or more anchors 64 of the second anchor graph 62 may form a polygon with external angles that do not sum to 360 degrees. In response to this inconsistency, the processor 30 may generate the combined anchor graph 72 at least in part by rotating and/or translating at least one of the repositioned first anchor graph 52 and the second anchor graph 62. FIG. 15 shows a repositioned second anchor graph 82 in which the second anchor graph 62 has been rotated such that the second plurality of anchors 64 have a second plurality of new estimated positions 80. The second plurality of new estimated positions 80 may be connected by a second plurality of repositioned edges 88. A second plurality of estimated repositioned angles 86 may be formed by respective pairs of repositioned edges 88.

Figure 16:
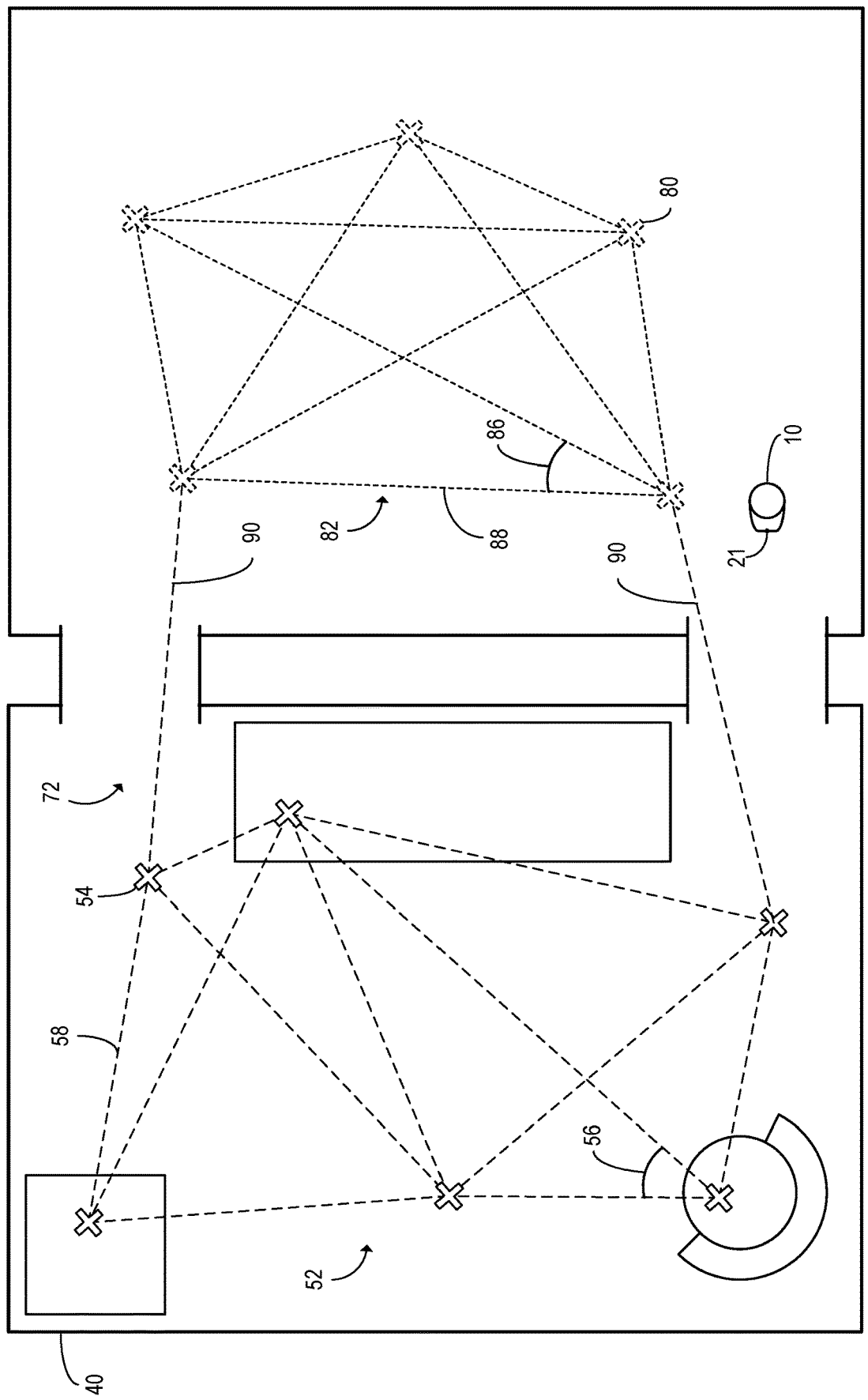

In some embodiments in which the processor 30 repositions the second anchor graph 62 when generating the combined anchor graph 72, the processor 30 may generate the combined anchor graph 72 at least in part by modifying an estimated length of at least one edge of the repositioned first anchor graph 52 and/or the second anchor graph 62. Thus, subgraphs of the first anchor graph 52 and/or the second anchor graph 62 may be rotated and/or translated separately from each other when the combined anchor graph 72 is generated. In some embodiments, the processor 30 may modify an estimated length of at least one border edge 74. FIG. 16 shows the combined anchor graph 72 in an example in which the repositioned first anchor graph 52 and the repositioned second anchor graph 82 have been recombined after the second anchor graph 82 has been rotated. As shown in FIG. 16, the repositioned first anchor graph 52 and the repositioned second anchor graph 82 are connected by modified border edges 90. The modified border edges 90 connect repositioned anchors 54 of the first plurality of repositioned anchors 54 to the new estimated positions 80 of the second plurality of anchors 64.

Figure 17:
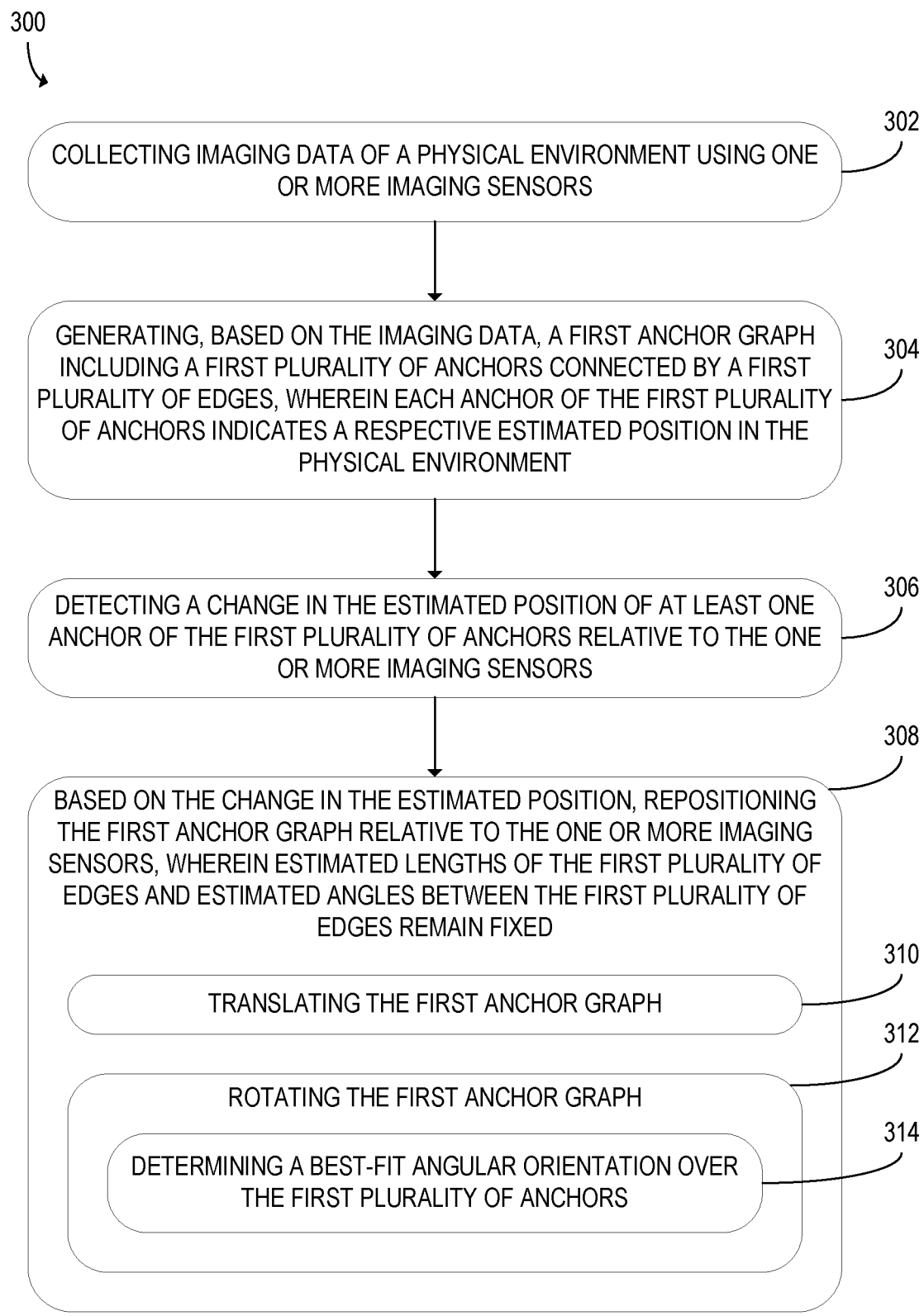
FIGS. 17 and 18 show a flowchart of a method for use with a computing system, according to one embodiment of the present disclosure.

FIG. 17 shows a flowchart of a method 300 for use with a computing system. The computing system may be the head-mounted display device 10 of FIG. 1A, the robot 100 of FIG. 1B, or some other computing system. The method 300 may be performed at least in part by a processor included in the computing system. The method 300 includes, at step 302, collecting imaging data of a physical environment using one or more imaging sensors. For example, the one or more imaging sensors may include one or more RGB cameras and/or depth cameras. The imaging data may be collected in one or more timesteps.

At step 304, the method 300 may further include generating, based on the imaging data, a first anchor graph including a first plurality of anchors connected by a first plurality of edges. Each anchor of the first plurality of anchors may indicate a respective estimated position in the physical environment. For example, generating the first anchor graph may include identifying features in the physical environment such as edges of objects. Imaging data associated with such features may be stored in memory of the computing system to identify such features as anchors.

At step 306, the method 300 may further include detecting a change in the estimated position of at least one anchor of the first plurality of anchors relative to the one or more imaging sensors. The change in the estimated position may occur due to motion of the one or more imaging sensors in the physical environment. Additionally or alternatively, the change in the estimated position may occur due to error in the image data. The change in the estimated position may be a change that occurs between a first timestep and a subsequent timestep.

At step 308, the method 300 may further include repositioning the first anchor graph relative to the one or more imaging sensors. The first anchor graph may be repositioned based on the change in the estimated position. In some embodiments, estimated lengths of the first plurality of edges and/or estimated angles between the first plurality of edges may remain fixed. Thus, the first anchor graph as a whole, rather than individual anchors, may be repositioned. In some embodiments, repositioning the first anchor graph may include, at step 310, translating the first anchor graph. Additionally or alternatively, repositioning the first anchor graph may include, at step 312, rotating the first anchor graph. In embodiments in which repositioning the first anchor graph includes rotating the first anchor graph, the method 300 may further include, at step 314, determining a best-fit angular orientation over the first plurality of anchors. For example, determining the best-fit angular orientation may include applying a least-squares algorithm to the estimated locations of the anchors.

Figure 18:
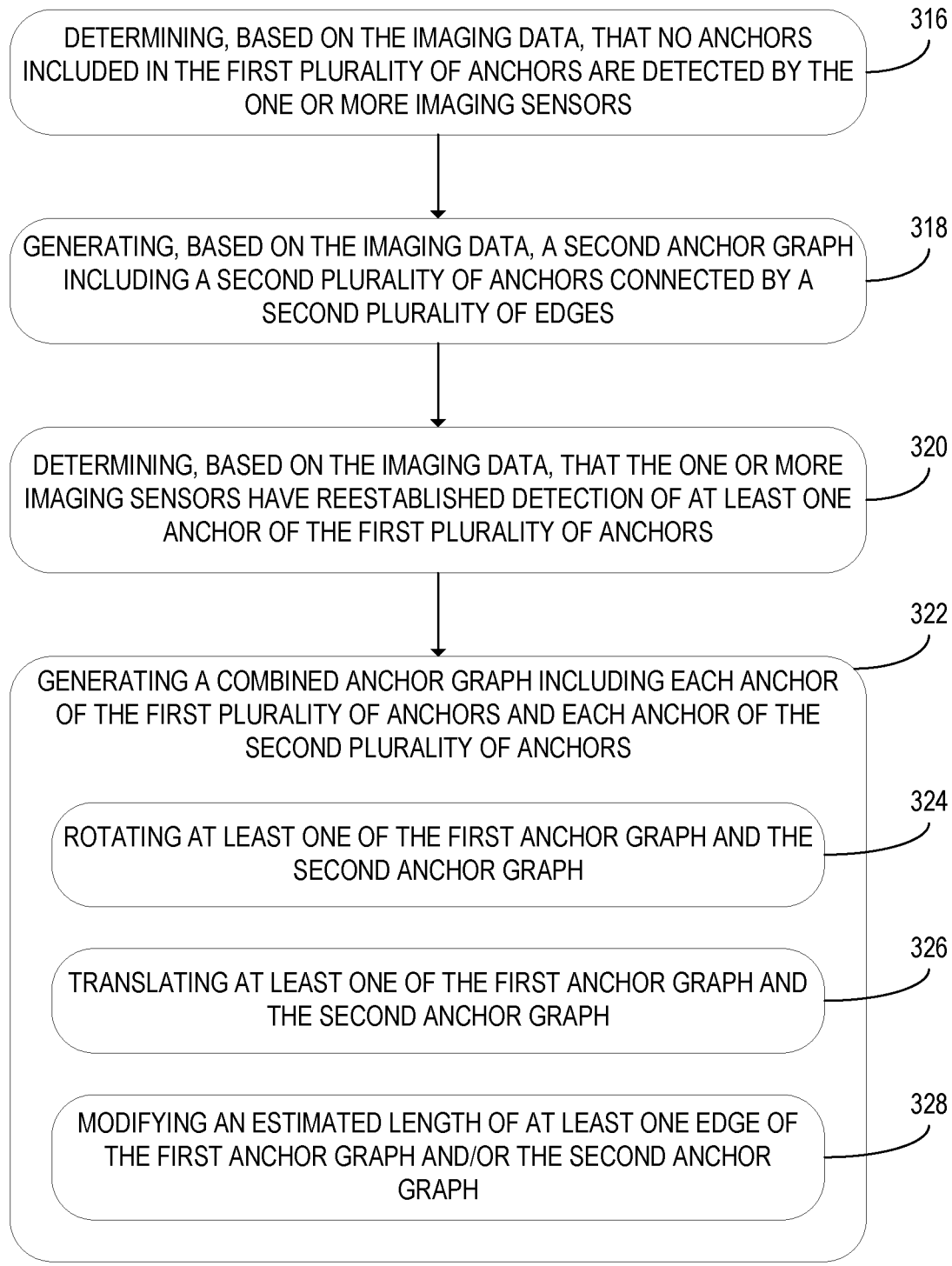

FIG. 18 shows a flowchart of additional steps that may optionally be performed as part of the method 300. At step 316, the method 300 may further include determining, based on the imaging data, that no anchors included in the first plurality of anchors are detected by the one or more imaging sensors. In response to this determination, the method 300 may further include, at step 318, generating a second anchor graph including a second plurality of anchors connected by a second plurality of edges. Similarly to the first anchor graph, the second anchor graph may be generated based on the imaging data collected by the one or more imaging sensors. Each anchor of the second plurality of anchors may indicate a respective estimated position in the physical environment. The respective estimated position of each anchor of the second plurality of anchors may be determined by identifying at least one feature in the image data. In some embodiments, the first plurality of anchors and the second plurality of anchors are disjoint.

At step 320, the method 300 may further include determining, based on the imaging data, that the one or more imaging sensors have reestablished detection of at least one anchor of the first plurality of anchors. Based on the determination that the one or more imaging sensors have reestablished detection of the at least one anchor of the first plurality of anchors, the method 300 may further include, at step 322, generating a combined anchor graph including each anchor of the first plurality of anchors and each anchor of the second plurality of anchors. In some embodiments, generating the combined anchor graph may include, at step 324, rotating at least one of the first anchor graph and the second anchor graph. Additionally or alternatively, generating the combined anchor graph may include, at step 326, translating at least one of the first anchor graph and the second anchor graph. In some embodiments, generating the combined anchor graph may include, at step 328, modifying an estimated length of at least one edge of the first anchor graph and/or the second anchor graph. For example, the first anchor graph and/or the second anchor graph may be divided into two or more subgraphs that are translated and/or rotated and are subsequently recombined into the combined anchor graph.

In some embodiments, the methods and processes described herein may be tied to a computing system of one or more computing devices. In particular, such methods and processes may be implemented as a computer-application program or service, an application-programming interface (API), a library, and/or other computer-program product.

Figure 19:
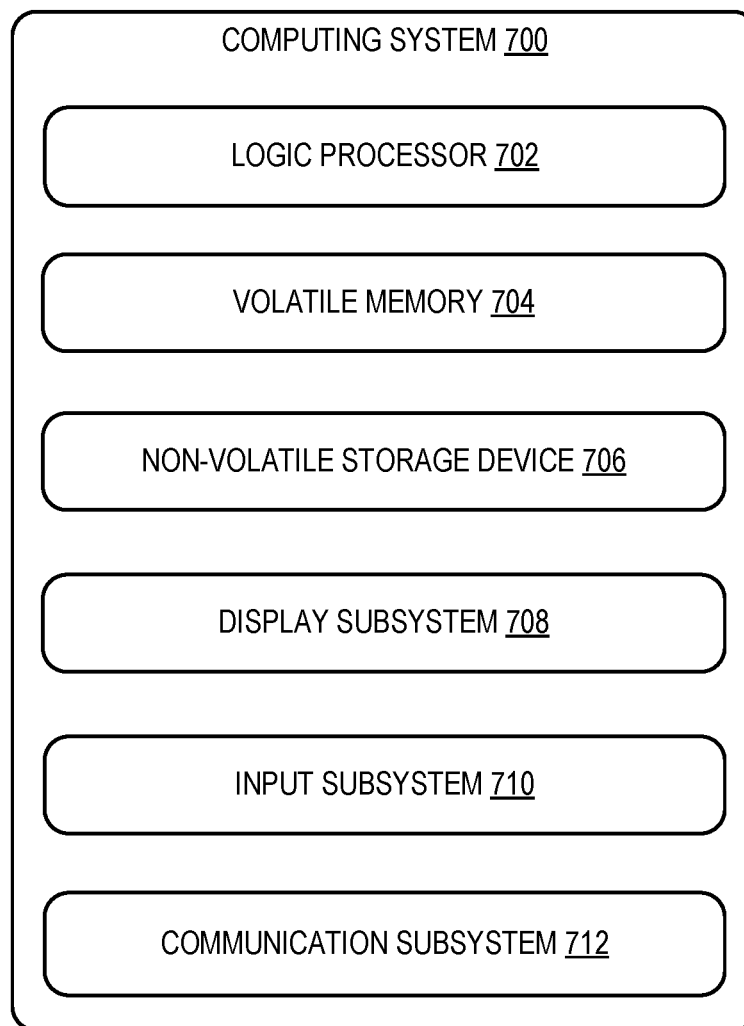
FIG. 19 shows a schematic representation of an example computing system, according to one embodiment of the present disclosure.

FIG. 19 schematically shows a non-limiting embodiment of a computing system 700 that can enact one or more of the methods and processes described above. Computing system 700 is shown in simplified form. Computing system 700 may, for example, embody the head-mounted display device 10 of FIG. 1A, the robot 100 of FIG. 1B, or some other computing system. Computing system 700 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented/virtual reality devices.

Computing system 700 includes a logic processor 702, volatile memory 704, and a non-volatile storage device 706. Computing system 700 may optionally include a display subsystem 708, input subsystem 710, communication subsystem 712, and/or other components not shown in FIG. 19.

Logic processor 702 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor 702 may include one or more physical processors (hardware) configured to execute software instructions. Additionally or alternatively, the logic processor 702 may include one or more hardware logic circuits or firmware devices configured to execute hardware-implemented logic or firmware instructions. Processors of the logic processor 702 may be single-core or multi-core, and the instructions executed thereon may be configured for sequential, parallel, and/or distributed processing. Individual components of the logic processor 702 optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects may be run on different physical logic processors of various different machines.

Volatile memory 704 may include physical devices that include random access memory. Volatile memory 704 is typically utilized by logic processor 702 to temporarily store information during processing of software instructions. It will be appreciated that volatile memory 704 typically does not continue to store instructions when power is cut to the volatile memory 704.

Non-volatile storage device 706 includes one or more physical devices configured to hold instructions executable by the logic processors to implement the methods and processes described herein. When such methods and processes are implemented, the state of non-volatile storage device 706 may be transformed—e.g., to hold different data.

Non-volatile storage device 706 may include physical devices that are removable and/or built-in. Non-volatile storage device 706 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 706 may include nonvolatile, dynamic, static, read/write, read-only, sequential-access, location-addressable, file-addressable, and/or content-addressable devices. It will be appreciated that non-volatile storage device 706 is configured to hold instructions even when power is cut to the non-volatile storage device 706.

Aspects of logic processor 702, volatile memory 704, and non-volatile storage device 706 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system 700 implemented to perform a particular function. In some cases, a program may be instantiated via logic processor 702 executing instructions held by non-volatile storage device 706, using portions of volatile memory 704. It will be understood that different programs may be instantiated from the same application, service, code block, object, library, routine, API, function, etc. Likewise, the same program may be instantiated by different applications, services, code blocks, objects, routines, APIs, functions, etc. The term "program" encompasses individual or groups of executable files, data files, libraries, drivers, scripts, database records, etc.

When included, display subsystem 708 may be used to present a visual representation of data held by non-volatile storage device 706. As the herein described methods and processes change the data held by the non-volatile storage device 706, and thus transform the state of the non-volatile storage device 706, the state of display subsystem 708 may likewise be transformed to visually represent changes in the underlying data. Display subsystem 708 may include one or more display devices utilizing virtually any type of technology. Such display devices may be combined with logic processor 702, volatile memory 704, and/or non-volatile storage device 706 in a shared enclosure, or such display devices may be peripheral display devices.

When included, input subsystem 710 may comprise or interface with one or more user-input devices such as a keyboard, mouse, touch screen, or game controller. In some embodiments, the input subsystem 710 may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection, gaze detection, and/or intent recognition; as well as electric-field sensing componentry for assessing brain activity; and/or any other suitable sensor.

When included, communication subsystem 712 may be configured to communicatively couple computing system 700 with one or more other computing devices. Communication subsystem 712 may include wired and/or wireless communication devices compatible with one or more different communication protocols. As non-limiting examples, the communication subsystem 712 may be configured for communication via a wireless telephone network, or a wired or wireless local- or wide-area network. In some embodiments, the communication subsystem 712 may allow computing system 700 to send and/or receive messages to and/or from other devices via a network such as the Internet.

According to one aspect of the present disclosure, a computing system is provided, including one or more imaging sensors configured to collect imaging data of a physical environment. The computing system may further include a processor configured to generate, based on the imaging data, a first anchor graph. The first anchor graph may include a first plurality of anchors connected by a first plurality of edges, wherein each anchor of the first plurality of anchors indicates a respective estimated position in the physical environment. The processor may be further configured to detect a change in the estimated position of at least one anchor of the first plurality of anchors relative to the one or more imaging sensors. Based on the change in the estimated position, the processor may be further configured to reposition the first anchor graph relative to the one or more imaging sensors, wherein estimated lengths of the first plurality of edges and estimated angles between the first plurality of edges remain fixed.

According to this aspect, the computing system may include a head-mounted display device.

According to this aspect, the processor may be further configured to reposition the first anchor graph at least in part by translating the first anchor graph.

According to this aspect, the processor may be further configured to reposition the first anchor graph at least in part by rotating the first anchor graph.

According to this aspect, the processor may be further configured to rotate the first anchor graph at least in part by determining a best-fit angular orientation over the first plurality of anchors.

According to this aspect, the best-fit angular orientation may be a weighted best-fit angular orientation. The processor may be further configured to determine a respective weight of each anchor of the first plurality of anchors based at least in part on an estimated distance between the anchor and the one or more imaging sensors.

According to this aspect, the best-fit angular orientation may be a weighted best-fit angular orientation. The processor may be further configured to determine a respective weight of each anchor of the first plurality of anchors based at least in part on a change in an estimated angular position of the anchor.

According to this aspect, the processor may be further configured to generate, based on the imaging data, a second anchor graph including a second plurality of anchors connected by a second plurality of edges. Each anchor of the second plurality of anchors may indicate a respective estimated position in the physical environment. The first plurality of anchors and the second plurality of anchors may be disjoint.

According to this aspect, the processor may be further configured to determine, based on the imaging data, that no anchors included in the first plurality of anchors are detected by the one or more imaging sensors. The processor may be further configured to generate the second anchor graph in response to determining that no anchors included in the first plurality of anchors are detected by the one or more imaging sensors.

According to this aspect, the processor may be further configured to determine, based on the imaging data, that the one or more imaging sensors have reestablished detection of at least one anchor of the first plurality of anchors. Based on the determination that the one or more imaging sensors have reestablished detection of the at least one anchor of the first plurality of anchors, the processor may be further configured to generate a combined anchor graph including each anchor of the first plurality of anchors and each anchor of the second plurality of anchors.

According to this aspect, the processor may be further configured to generate the combined anchor graph at least in part by rotating and/or translating at least one of the first anchor graph and the second anchor graph.

According to this aspect, the processor may be further configured to generate the combined anchor graph at least in part by modifying an estimated length of at least one edge of the first anchor graph and/or the second anchor graph.

According to another aspect of the present disclosure, a method for use with a computing system is provided. The method may include collecting imaging data of a physical environment using one or more imaging sensors. The method may further include generating, based on the imaging data, a first anchor graph including a first plurality of anchors connected by a first plurality of edges. Each anchor of the first plurality of anchors may indicate a respective estimated position in the physical environment. The method may further include detecting a change in the estimated position of at least one anchor of the first plurality of anchors relative to the one or more imaging sensors. Based on the change in the estimated position, the method may further include repositioning the first anchor graph relative to the one or more imaging sensors, wherein estimated lengths of the first plurality of edges and estimated angles between the first plurality of edges remain fixed.

According to this aspect, repositioning the first anchor graph may include translating the first anchor graph.

According to this aspect, repositioning the first anchor graph may include rotating the first anchor graph.

According to this aspect, repositioning the first anchor graph may include determining a best-fit angular orientation over the first plurality of anchors.

According to this aspect, the method may further include generating, based on the imaging data, a second anchor graph including a second plurality of anchors connected by a second plurality of edges. Each anchor of the second plurality of anchors may indicate a respective estimated position in the physical environment. The first plurality of anchors and the second plurality of anchors may be disjoint.

According to this aspect, the method may further include determining, based on the imaging data, that no anchors included in the first plurality of anchors are detected by the one or more imaging sensors. The method may further include generating the second anchor graph in response to determining that no anchors included in the first plurality of anchors are detected by the one or more imaging sensors.

According to this aspect, the method may further include determining, based on the imaging data, that the one or more imaging sensors have reestablished detection of at least one anchor of the first plurality of anchors. Based on the determination that the one or more imaging sensors have reestablished detection of the at least one anchor of the first plurality of anchors, the method may further include generating a combined anchor graph including each anchor of the first plurality of anchors and each anchor of the second plurality of anchors.

According to another aspect of the present disclosure, a head-mounted display device is provided, including one or more imaging sensors configured to collect imaging data of a physical environment. The head-mounted display device may further include a processor configured to generate, based on the imaging data, a first anchor graph including a first plurality of anchors connected by a first plurality of edges. Each anchor of the first plurality of anchors may indicate a respective estimated position in the physical environment. The processor may be further configured to detect a change in the estimated position of at least one anchor of the first plurality of anchors relative to the one or more imaging sensors. The processor may be further configured to, based on the change in the estimated position, reposition the first anchor graph relative to the one or more imaging sensors. Estimated lengths of the first plurality of edges and estimated angles between the first plurality of edges may remain fixed. The processor may be further configured to determine, based on the imaging data, that no anchors included in the first plurality of anchors are detected by the one or more imaging sensors. The processor may be further configured to generate, based on the imaging data, a second anchor graph including a second plurality of anchors connected by a second plurality of edges. Each anchor of the second plurality of anchors may indicate a respective estimated position in the physical environment. The first plurality of anchors and the second plurality of anchors may be disjoint. The processor may be further configured to determine, based on the imaging data, that the one or more imaging sensors have reestablished detection of at least one anchor of the first plurality of anchors. The processor may be further configured to generate a combined anchor graph including each anchor of the first plurality of anchors and each anchor of the second plurality of anchors.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system, comprising:
   one or more imaging sensors configured to collect imaging data of a physical environment; and
   a processor configured to:
   generate, based on the imaging data, a first anchor graph including a first plurality of anchors connected by a first plurality of edges, wherein each anchor of the first plurality of anchors indicates a respective estimated position in the physical environment;
   position one or more virtual objects in relation to the physical environment based on the first anchor graph;
   detect a change in the estimated position of at least one anchor of the first plurality of anchors relative to the one or more imaging sensors;
   based on the change in the estimated position, reposition the first anchor graph relative to the one or more imaging sensors, wherein estimated lengths of the first plurality of edges and estimated angles between the first plurality of edges remain fixed;
   generate, based on the imaging data, a second anchor graph including a second plurality of anchors connected by a second plurality of edges, wherein each anchor of the second plurality of anchors indicates a respective estimated position in the physical environment, and wherein the first plurality of anchors and the second plurality of anchors are disjoint; and
   generate a combined anchor graph including each anchor of the first plurality of anchors and each anchor of the second plurality of anchors, at least in part, by modifying an estimated length of at least one edge of the first anchor graph and/or the second anchor graph.

2. The computing system of claim 1, wherein the computing system comprises a head-mounted display device.

3. The computing system of claim 1, wherein the processor is further configured to reposition the first anchor graph at least in part by translating the first anchor graph.

4. The computing system of claim 1, wherein the processor is further configured to reposition the first anchor graph at least in part by rotating the first anchor graph.

5. The computing system of claim 4, wherein the processor is further configured to rotate the first anchor graph at least in part by determining a best-fit angular orientation over the first plurality of anchors.

6. The computing system of claim 5, wherein the best-fit angular orientation is a weighted best-fit angular orientation, and wherein the processor is further configured to determine a respective weight of each anchor of the first plurality of anchors based at least in part on an estimated distance between the anchor and the one or more imaging sensors.

7. The computing system of claim 5, wherein the best-fit angular orientation is a weighted best-fit angular orientation, and wherein the processor is further configured to determine a respective weight of each anchor of the first plurality of anchors based at least in part on a change in an estimated angular position of the anchor.

8. The computing system of claim 1, wherein the processor is further configured to:
determine, based on the imaging data, that no anchors included in the first plurality of anchors are detected by the one or more imaging sensors; and
generate the second anchor graph in response to determining that no anchors included in the first plurality of anchors are detected by the one or more imaging sensors.

9. The computing system of claim 8, wherein the processor is further configured to:
determine, based on the imaging data, that the one or more imaging sensors have reestablished detection of at least one anchor of the first plurality of anchors; and
based on the determination that the one or more imaging sensors have reestablished detection of the at least one anchor of the first plurality of anchors, generate the combined anchor graph.

10. The computing system of claim 9, wherein the processor is configured to generate the combined anchor graph at least in part by rotating and/or translating at least one of the first anchor graph and the second anchor graph.

11. A method for use with a computing system, the method comprising:
collecting imaging data of a physical environment using one or more imaging sensors;
generating, based on the imaging data, a first anchor graph including a first plurality of anchors connected by a first plurality of edges, wherein each anchor of the first plurality of anchors indicates a respective estimated position in the physical environment;
positioning one or more virtual objects in relation to the physical environment based on the first anchor graph;
detecting a change in the estimated position of at least one anchor of the first plurality of anchors relative to the one or more imaging sensors;
based on the change in the estimated position, repositioning the first anchor graph relative to the one or more imaging sensors, wherein estimated lengths of the first plurality of edges and estimated angles between the first plurality of edges remain fixed;
generating, based on the imaging data, a second anchor graph including a second plurality of anchors connected by a second plurality of edges, wherein each anchor of the second plurality of anchors indicates a respective estimated position in the physical environment, and wherein the first plurality of anchors and the second plurality of anchors are disjoint; and
generating a combined anchor graph including each anchor of the first plurality of anchors and each anchor of the second plurality of anchors, at least in part, by modifying an estimated length of at least one edge of the first anchor graph and/or the second anchor graph.

12. The method of claim 11, wherein repositioning the first anchor graph includes translating the first anchor graph.

13. The method of claim 11, wherein repositioning the first anchor graph includes rotating the first anchor graph.

14. The method of claim 13, wherein repositioning the first anchor graph includes determining a best-fit angular orientation over the first plurality of anchors.

15. The method of claim 11, further comprising:
determining, based on the imaging data, that no anchors included in the first plurality of anchors are detected by the one or more imaging sensors; and
generating the second anchor graph in response to determining that no anchors included in the first plurality of anchors are detected by the one or more imaging sensors.

16. The method of claim 15, further comprising:
determining, based on the imaging data, that the one or more imaging sensors have reestablished detection of at least one anchor of the first plurality of anchors; and
based on the determination that the one or more imaging sensors have reestablished detection of the at least one anchor of the first plurality of anchors, generating a combined anchor graph including each anchor of the first plurality of anchors and each anchor of the second plurality of anchors.

17. A head-mounted display device, comprising:
one or more imaging sensors configured to collect imaging data of a physical environment; and
a processor configured to:
generate, based on the imaging data, a first anchor graph including a first plurality of anchors connected by a first plurality of edges, wherein each anchor of the first plurality of anchors indicates a respective estimated position in the physical environment;
position one or more virtual objects in relation to the physical environment based on the first anchor graph;
detect a change in the estimated position of at least one anchor of the first plurality of anchors relative to the one or more imaging sensors;
based on the change in the estimated position, reposition the first anchor graph relative to the one or more imaging sensors, wherein estimated lengths of the first plurality of edges and estimated angles between the first plurality of edges remain fixed;
determine, based on the imaging data, that no anchors included in the first plurality of anchors are detected by the one or more imaging sensors;
generate, based on the imaging data, a second anchor graph including a second plurality of anchors connected by a second plurality of edges, wherein:
each anchor of the second plurality of anchors indicates a respective estimated position in the physical environment; and
the first plurality of anchors and the second plurality of anchors are disjoint;

determine, based on the imaging data, that the one or more imaging sensors have reestablished detection of at least one anchor of the first plurality of anchors; and generate a combined anchor graph including each anchor of the first plurality of anchors and each anchor of the second plurality of anchors, at least in part, by modifying an estimated length of at least one edge of the first anchor graph and/or the second anchor graph.

* * * * *